US011994527B2

(12) United States Patent
Kawamoto et al.

(10) Patent No.: US 11,994,527 B2
(45) Date of Patent: May 28, 2024

(54) SAMPLE MEASURING APPARATUS AND METHOD OF CIRCULATING AIR IN REAGENT STORAGE

(71) Applicant: SYSMEX CORPORATION, Kobe (JP)

(72) Inventors: Yutaka Kawamoto, Kobe (JP); Tomohiro Kuroiwa, Kobe (JP); Shingo Kaida, Kobe (JP)

(73) Assignee: SYSMEX CORPORATION, Kobe (JP)

(*) Notice: Subject to any disclaimer, the term of this patent is extended or adjusted under 35 U.S.C. 154(b) by 703 days.

(21) Appl. No.: 16/937,651

(22) Filed: Jul. 24, 2020

(65) Prior Publication Data
US 2020/0355712 A1 Nov. 12, 2020

Related U.S. Application Data

(63) Continuation of application No. PCT/JP2018/045090, filed on Dec. 7, 2018.

(30) Foreign Application Priority Data

Jan. 25, 2018 (JP) ................... 2018-010312

(51) Int. Cl.
G01N 35/02 (2006.01)
B01L 7/00 (2006.01)
G01N 35/00 (2006.01)

(52) U.S. Cl.
CPC .............. *G01N 35/025* (2013.01); *B01L 7/00* (2013.01); *G01N 2035/00356* (2013.01); *G01N 2035/00445* (2013.01)

(58) Field of Classification Search
CPC ....... G01N 35/025; G01N 2035/00356; G01N 35/04; G01N 2035/00445;
(Continued)

(56) References Cited

U.S. PATENT DOCUMENTS 5,207,987 A 5/1993 Kureshy et al.
2005/0043163 A1 2/2005 Malugvist et al.
(Continued)

FOREIGN PATENT DOCUMENTS

CA 1072774 A 3/1980
CN 104395760 A 3/2015
(Continued)

OTHER PUBLICATIONS

The Office Action (CNOA) dated Dec. 22, 2022 in a counterpart Chinese patent application.
(Continued)

Primary Examiner — Jill A Warden
Assistant Examiner — John McGuirk
(74) Attorney, Agent, or Firm — METROLEX IP LAW GROUP, PLLC

(57) ABSTRACT

A sample measuring apparatus and a method of circulating air in a reagent storage are provided. The sample measuring apparatus includes: a measuring unit that measures a sample by using a reagent stored in a reagent container; a reagent storage that stores the reagent container; a reagent container holder arranged in the reagent storage and that holds the reagent container; a fin that circulates air in the reagent storage; and a driving unit that drives the reagent container holder and the fin to rotate.

18 Claims, 13 Drawing Sheets

(58) Field of Classification Search
CPC .............. G01N 2035/0443; B01L 7/00; B01L 2200/16; B01L 2300/0803; B01L 2300/1844; B01L 2300/1894; B01L 9/06
See application file for complete search history.

(56) References Cited

U.S. PATENT DOCUMENTS

| | | | |
|---|---|---|---|
| 2012/0218854 A1 | | 8/2012 | Behringer et al. |
| 2012/0237398 A1 | | 9/2012 | Katsumi et al. |

FOREIGN PATENT DOCUMENTS

| | | | | |
|---|---|---|---|---|
| CN | 205749525 | U | | 11/2016 |
| EP | 2500732 | A2 | | 9/2012 |
| JP | S57130183 | U | | 8/1982 |
| JP | 2002-014107 | A | | 1/2002 |
| JP | 2002014107 | A | * | 1/2002 |
| JP | 2012-137329 | A | | 7/2012 |
| JP | 2014-119328 | A | | 6/2014 |
| JP | 2014119328 | A | * | 6/2014 |
| JP | 2016-114610 | A | | 6/2016 |
| JP | 2016114610 | A | * | 6/2016 |
| JP | 2017-44508 | A | | 3/2017 |
| JP | 2017-90353 | A | | 5/2017 |
| JP | 2017-150871 | A | | 8/2017 |
| WO | 2014/002952 | A1 | | 1/2014 |

OTHER PUBLICATIONS

The International Search Report (ISR) of PCT/JP2018/045090 dated Feb. 12, 2019.
The Written Opinion (WO) of PCT/JP2018/045090 dated Feb. 12, 2019.
The extended European search report (EESR) dated Oct. 15, 2021.
The Office Action (JPOA) dated Oct. 5, 2021 in a counterpart Japanese patent application.
The Communication pursuant to Article 94(3) EPC dated Mar. 13, 2023, in a counterpart European patent application.
The Office Action dated Oct. 14, 2023, in a counterpart Chinese patent application.
The Office Action dated Aug. 2, 2023, in a counterpart Chinese patent application.
Office Action issued on Dec. 27, 2023, in a counterpart Chinese patent application.
Office Action issued on Mar. 26, 2024, in a counterpart European patent App. No. 18 902 101.7-1001.
Office Action issued on Mar. 19, 2024, in a counterpart Chinese patent application.

* cited by examiner

SAMPLE MEASURING APPARATUS AND METHOD OF CIRCULATING AIR IN REAGENT STORAGE

CROSS REFERENCE TO RELATED APPLICATIONS

This application is a continuation application of International Application No. PCT/JP2018/045090, filed on Dec. 7, 2018, which claims priority based on the Article 8 of Patent Cooperation Treaty from prior Japanese Patent Application No. 2018-010312, filed on Jan. 25, 2018, the entire contents of which are incorporated herein by reference.

BACKGROUND

The disclosure relates to a sample measuring apparatus and a method of circulating air in a reagent storage.

Conventionally, there has been known a sample measuring apparatus (for example, see Japanese Patent Application Publication No. 2014-119328 ("Patent Literature 1")).

As illustrated in FIG. 17, the above-mentioned Patent Literature 1 discloses an automatic analyzer 900 (sample measuring apparatus) that includes an analyzing unit 901, which analyzes a sample using a reagent, and a reagent depository 903, which stores reagent bottles 902 each storing the reagent. This automatic analyzer 900 of Patent Literature 1 further includes a reagent holding rack 904 arranged in the reagent depository 903 and that holds the reagent bottles 902, a driving unit 905 that rotates and drives the reagent holding rack 904, and a circulation device 906 that circulates air in the reagent depository 903.

However, since the automatic analyzer 900 (sample measuring apparatus) described in the above-mentioned Patent Literature 1 includes the driving unit 905 that rotates and drives the reagent holding rack 904 and the circulation device 906 that circulates air in the reagent depository 903, it is required to provide a motor to drive the circulation device 906. For this reason, there is a problem that the apparatus is enlarged by a space for arranging the motor of the circulation device 906. Additionally, there is a problem that the number of parts is increased for the motor of the circulation device 906.

One or more aspects aim to inhibit an enlargement of an apparatus and also to inhibit an increase in the number of parts.

SUMMARY

A sample measuring apparatus includes: a measuring unit that measures a sample by using a reagent stored in a reagent container; a reagent storage that stores the reagent container; a reagent container holder arranged in the reagent storage and that holds the reagent container; a fin that circulates air in the reagent storage; and a driving unit that drives the reagent container holder and the fin to rotate.

A sample measuring apparatus includes: a measuring unit that measures a sample by using a reagent stored in a reagent container; a reagent storage that stores the reagent container; a reagent container holder arranged in the reagent storage and that holds the reagent container; a fin that circulates air in the reagent storage; and a driving unit. The reagent container holder comprises a first reagent container holder and a second reagent container holder that is arranged around the first reagent container holder. The driving unit comprises a first driving unit that drives the first reagent container holder to rotate and a second driving unit that drives the second reagent container holder and the fin to rotate.

A method of circulating air in a reagent storage, includes: rotating a reagent container holder that is arranged in a reagent storage and holds a reagent container; rotating a fin in conjunction with the reagent container holder; and circulating air in the reagent storage by the rotating of the fin.

DETAILED DESCRIPTION

Figure 1:
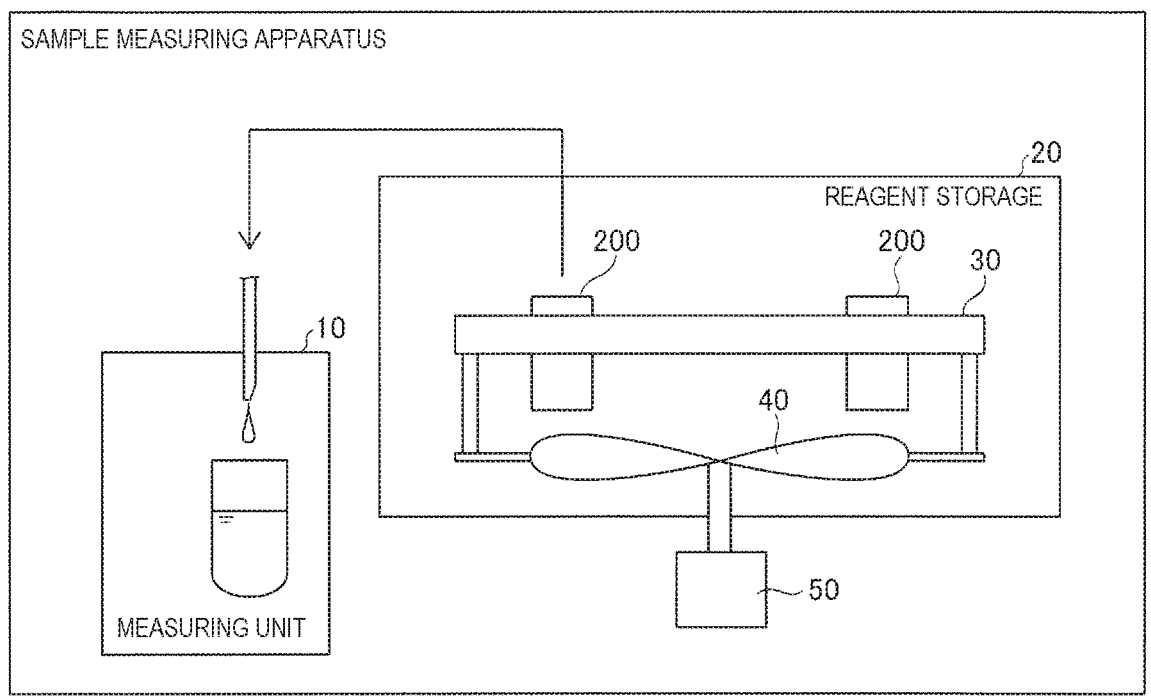
FIG. 1 is a schematic view illustrating an overview of a sample measuring apparatus.

A sample measuring apparatus (100) according to a first aspect includes: a measuring unit (10) that measures a sample by using a reagent stored in a reagent container (200); a reagent storage (20) that stores the reagent container (200); a reagent container holder (30) arranged in the reagent storage (20) and that holds the reagent container (200); a fin (40) that circulates air in the reagent storage (20); and a driving unit (50) that drives the reagent container holder (30) and the fin (40) to rotate.

In the sample measuring apparatus (100) according to a first aspect, as described above, the driving unit (50) that drives the reagent container holder (30) and the fin (40) to rotate is provided. With this, there is no need to provide a separate driving unit that drives the fin (40) to rotate in addition to the driving unit (50) that drives the reagent container holder (30) to rotate, and thus there is no need to secure a space for such a driving unit. Consequently, it is possible to inhibit an enlargement of the apparatus. Additionally, since there is no need to provide a separate driving unit that drives the fin (40) to rotate, it is possible to simplify the apparatus configuration and also to inhibit an increase in the number of parts.

It may be preferable that the sample measuring apparatus (100) according to a first aspect includes: a cooling unit (22) that cools air in the reagent storage (20); and the driving unit (50) drives the fin (40) to circulate air cooled by the cooling unit (22). With this configuration, since the fin (40) can circulate the air cooled by the cooling unit (22) in the reagent storage (20), it is possible to keep the inside of the reagent storage (20) cool efficiently.

In the sample measuring apparatus (100) according to a first aspect, it may be preferable that the fin (40) and the reagent container holder (30) are arranged such that a rotation shaft of the fin (40) and a rotation shaft of the reagent container holder (30) are the same. With this configuration, since the rotation shaft of the reagent container holder (30) and the rotation shaft of the fin (40) can be commonalized, it is possible to simplify the apparatus configuration.

In the sample measuring apparatus (100) according to a first aspect, it may be preferable that the reagent container holder (30) has a circular outer circumferential edge such that the reagent containers (200) are arranged circularly. With this configuration, it is possible to arrange the multiple reagent containers (200) circularly in the substantially circular reagent container holder (30) and store the multiple reagent containers (200) in a depository compactly.

It may be preferable that the sample measuring apparatus (100) according to a first aspect includes: a rotation table (38) that supports the reagent container holder (30) through a joint part (39); and a supporting unit (521) that supports the rotation table (38), in which the fin (40) is provided with the rotation table (38). With this configuration, since the fin (40) can be provided with the rotation table (38) supporting the reagent container holder (30), there is no need to provide an additional space to provide the fin (40). With this, it is possible to simplify the apparatus configuration and to miniaturize the apparatus.

In this case, it may be preferable that the fin (40) includes a protrusion (41) provided integrally with the rotation table (38). With this configuration, the protrusion (41) is rotated with the rotation of the rotation table (38), and thus it is possible to generate a flow of air in the reagent storage (20) along with the rotational movement of the reagent container holder (30).

It may be preferable that the sample measuring apparatus (100) according to a first aspect includes: a transmission shaft (42) that transmits rotation and driving of the driving unit (50) to the reagent container holder (30), in which the fin (40) is provided with the transmission shaft (42). With this configuration, the fin (40) is rotated with the rotation of the transmission shaft (42), and thus it is possible to generate a flow of air in the reagent storage (20) along with the rotational movement of the reagent container holder (30).

In the sample measuring apparatus (100) according to a first aspect, it may be preferable that the reagent container holder (30) includes a plate-shaped member (30a) having a through-hole (35), and the plate-shaped member (30a) holds the reagent container (200) such that a bottom surface of the reagent container (200) is exposed from the through-hole (35). With this configuration, it is possible to flow air in the reagent storage (20) by the reagent container (200) held by the reagent container holder (30) with the reagent container holder (30) rotated, and thus it is possible to circulate air in the reagent storage (20) in this way as well.

In this case, it may be preferable that the plate-shaped member (30a) includes suspending portions (34) that each suspend and hold the reagent container (200). With this configuration, it is possible to hold the multiple reagent containers (200) by the multiple suspending portions (34), and thus it is possible to easily increase the amount and the types of the reagent to be held.

A sample measuring apparatus (101) according to a second aspect includes: a measuring unit (10) that measures a sample by using a reagent stored in a reagent container (200); a reagent storage (20) that stores the reagent container (200); a reagent container holder (30) arranged in the reagent storage (20) and that holds the reagent container (200); a fin (40) that circulates air in the reagent storage (20); and a driving unit (50), in which the reagent container holder (30) includes a first reagent container holder (31) and a second reagent container holder (32) that is arranged around the first reagent container holder (31), and the driving unit (50) includes a first driving unit (51) that drives the first reagent container holder (31) to rotate and a second driving unit (52) that drives the second reagent container holder (32) and the fin (40) to rotate.

In the sample measuring apparatus (101) according to a second aspect, as described above, the second driving unit (52) that drives the second reagent container holder (32) and the fin (40) to rotate is provided. With this, there is no need to provide a separate driving unit that drives the fin (40) to rotate in addition to the second driving unit (52) that drives the second reagent container holder (32) to rotate, and thus there is no need to secure a space for such a driving unit. Consequently, it is possible to inhibit an enlargement of the apparatus. Additionally, since there is no need to provide a separate driving unit that drives the fin (40) to rotate, it is possible to simplify the apparatus configuration and also to inhibit an increase in the number of parts.

It may be preferable that the sample measuring apparatus (101) according to a second aspect includes: a cooling unit (22) that cools air in the reagent storage (20), in which the driving unit (50) drives the fin (40) to circulate air cooled by the cooling unit (22). With this configuration, since the fin (40) can circulate the air cooled by the cooling unit (22) in the reagent storage (20), it is possible to keep the inside of the reagent storage (20) cool efficiently.

In the sample measuring apparatus (101) according to a second aspect, it may be preferable that the fin (40), the first reagent container holder (31), and the second reagent container holder (32) are arranged such that a rotation shaft of the fin (40), a rotation shaft of the first reagent container holder (31), and a rotation shaft of the second reagent container holder (32) are the same. With this configuration, since the rotation shaft of the second reagent container holder (32) and the rotation shaft of the fin (40) can be commonalized, it is possible to simplify the apparatus configuration.

It may be preferable that the sample measuring apparatus (101) according to a second aspect includes: a rotation table (38) that supports the second reagent container holder (32) through a joint part (39); and a supporting unit (521) that supports the rotation table (38), in which the fin (40) is provided with the rotation table (38). With this configuration, since the fin (40) can be provided with the rotation table (38) supporting the second reagent container holder (32), there is no need to provide an additional space to provide the fin (40). With this, it is possible to simplify the apparatus configuration and to miniaturize the apparatus.

In this case, it may be preferable that the fin (40) includes a protrusion (41) provided integrally with the rotation table (38). With this configuration, the protrusion (41) is rotated with the rotation of the rotation table (38), and thus it is possible to generate a flow of air in the reagent storage (20) along with the rotational movement of the second reagent container holder (32).

A method of circulating air in a reagent storage (20) according to a third aspect includes: rotating a reagent container holder (30) that is arranged in a reagent storage (20) and that holds a reagent container (200); rotating a fin (40) in conjunction with the reagent container holder (30); and circulating air in the reagent storage (20) by the rotating of the fin (40).

In the method of circulating air in the reagent storage (20) according to a third aspect, as described above, the fin (40) is rotated and driven in conjunction with the reagent container holder (30). With this, there is no need to provide a separate driving unit that drives the fin (40) to rotate in addition to the driving unit (50) that drives the reagent container holder (30) to rotate, and thus there is no need to secure a space for such a driving unit. Consequently, it is possible to provide the method of circulating air in the reagent storage (20) capable of inhibiting an enlargement of the apparatus. Additionally, since there is no need to provide a separate driving unit that drives the fin (40) to rotate, it is possible to provide the method of circulating air in the reagent storage (20) capable of simplifying the apparatus configuration and also inhibiting an increase in the number of parts.

In the method of circulating air in the reagent storage (20) according to a third aspect, it may be preferable that air in the reagent storage (20) is cooled, and the cooled air is circulated by the fin (40). With this configuration, since the fin (40) can circulate the cooled air in the reagent storage (20), it is possible to cool the inside of the reagent storage (20) efficiently.

According to one or more aspects, as described above, it is possible to provide a sample measuring apparatus and a method of circulating air in a reagent storage capable of inhibiting an enlargement of an apparatus and also inhibiting an increase in the number of parts.

Hereinafter, embodiments are described with reference to the drawings.

[Overview of Sample Measuring Apparatus]

First, an overview of a sample measuring apparatus 100 according to an embodiment is described with reference to FIG. 1.

The sample measuring apparatus 100 is an apparatus that measures a measurement specimen created by adding a predetermined reagent to a sample collected from a subject.

The subject is mostly a human; however, the subject may be another animal other than a human. The sample measuring apparatus 100 performs measurement of a sample collected from a patient for laboratory testing or medical studies, for example. The sample is a sample derived from a living body. The sample derived from a living body is a liquid such as blood (whole blood, serum, or plasma), urine, or other body fluid collected from the subject, a liquid obtained by performing predetermined preprocessing on the collected body fluid or blood, or the like, for example. Additionally, the sample may be other than the liquid, such as a part of tissues or cells of the subject, for example. The sample measuring apparatus 100 detects predetermined target components contained in the sample. The target components may include predetermined components, cells, and particles in the sample of blood or urine, for example. The target components may be nucleic acids such as DNA (deoxyribonucleic acids), cells and cell substances, antigens or antibodies, proteins, peptides, and the like. The sample measuring apparatus 100 may be a measuring apparatus such as a blood cell counter, a blood coagulation measuring apparatus, an immune measuring apparatus, or a urine particle measuring apparatus, or a measuring apparatus other than the above.

For instance, the sample measuring apparatus 100 is an immune measuring apparatus that detects subject substances in the sample by using antigen-antibody reaction. The immune measuring apparatus detects antigens or antibodies, proteins, peptides, and the like contained in blood as the target components, for example. The immune measuring apparatus obtains serum or plasma as the sample and performs quantitative measurement or qualitative measurement on the antigens or the antibodies and the like contained in the sample. The antigen-antibody reaction includes not only a reaction between the antigens and the antibodies but also a reaction using specific binding substances such as aptamers. The aptamers are nucleic acid molecules or peptides synthesized to be bound specifically to specific substances.

The sample measuring apparatus 100 adds predetermined one or more types of reagents to the sample and prepares a measurement specimen. The reagents are set in the sample measuring apparatus 100 with the reagents each stored in a bottle-shaped reagent container 200. As illustrated in FIG. 1, the sample measuring apparatus 100 includes a measuring unit 10, a reagent storage 20, a reagent container holder 30, a fin 40, and a driving unit 50.

The measuring unit 10 measures the sample by using the reagent. Specifically, the measuring unit 10 adds the reagent from the reagent container 200 into the sample to prepare a measurement specimen and measures the sample. Additionally, the measuring unit 10 is configured to detect components contained in the measurement specimen prepared from the sample and the reagent. For a method of detecting the target components by the measuring unit 10, any method such as a chemical method, an optical method, or an electromagnetic method can be adopted depending on the target components. Based on the detection result, the measuring unit 10 measures whether there are the target components, the number or the amount of the target components, a density or a presence rate of the target components, and so on, for example.

The reagent storage 20 stores the reagent container 200 storing the reagent. The reagent storage 20 keeps the reagent cool or warm at a predetermined temperature. For example, the reagent storage 20 keeps the reagent cool at a predetermined temperature. That is, the temperature inside the reagent storage 20 is kept lower than the temperature outside the reagent storage 20.

The reagent container holder 30 is arranged in the reagent storage 20. Additionally, the reagent container holder 30 can hold multiple reagent containers 200. Moreover, the reagent containers 200 are set in the reagent container holder 30 automatically by the sample measuring apparatus 100 or manually by a user. The reagent container holder 30 may support the reagent containers 200 while suspending them as illustrated in FIG. 1. Furthermore, the reagent container holder 30 may support lower surfaces of the reagent containers 200 or grip side surfaces to support them. Additionally, the reagent container holder 30 may hold the reagent containers 200 with an engagement portion (not-illustrated) provided in a predetermined part of each reagent container 200 being engaged with a supporting portion of the reagent container holder 30.

The reagent container holder 30 has a circular shape in a plan view, for example. Additionally, the reagent container holder 30 allows the multiple reagent containers 200 to be arranged circularly. The reagent container holder 30 may have a shape other than a circular shape. For example, the reagent container holder 30 may be formed in a rectangular shape in a plan view. Moreover, the multiple reagent containers 200 may be arranged linearly.

The fin 40 circulates air in the reagent storage 20. Specifically, the fin 40 is provided in the reagent storage 20 and is rotated and driven to move air in the reagent storage 20. With this, it is possible to keep the inside of the reagent storage 20 cool or warm efficiently.

The driving unit 50 drives the reagent container holder 30 to rotate. Additionally, the driving unit 50 drives the fin 40 to rotate. That is, the driving unit 50 is a single driving unit that drives both the reagent container holder 30 and fin 40 to rotate. In other words, the fin 40 is driven to rotate in conjunction with the reagent container holder 30 and circulates air in the reagent storage 20. With this, there is no need to provide a separate driving unit that drives the fin 40 to rotate in addition to the driving unit 50 that drives the reagent container holder 30 to rotate, and thus there is no need to secure a space for such a driving unit. Consequently, it is possible to inhibit an enlargement of the apparatus. Additionally, since there is no need to provide a separate driving unit that drives the fin 40 to rotate, it is possible to simplify the apparatus configuration and also to inhibit an increase in the number of parts.

The driving unit 50 is arranged outside the reagent storage 20. For example, the driving unit 50 is arranged below the reagent storage 20.

Figure 2:
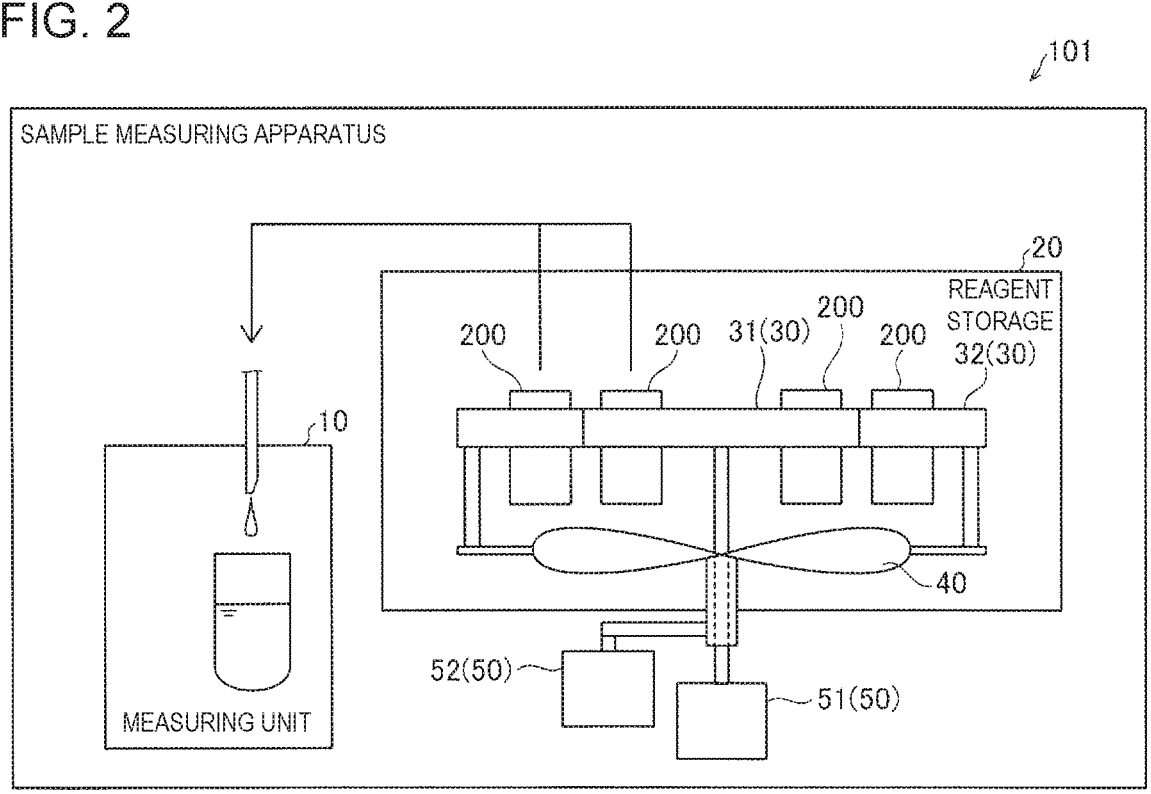
FIG. 2 is a schematic view illustrating an overview of a sample measuring apparatus of another configuration.

Next, an overview of a sample measuring apparatus 101 according to another configuration example is described with reference to FIG. 2.

The sample measuring apparatus 101 adds predetermined one or more types of reagents to the sample and prepares a measurement specimen. The reagents are set in the sample measuring apparatus 101 with the reagents each stored in the bottle-shaped reagent container 200. As illustrated in FIG. 2, the sample measuring apparatus 101 includes the measuring unit 10, the reagent storage 20, the reagent container holder 30, the fin 40, and the driving unit 50. The reagent container holder 30 includes a first reagent container holder 31 and a second reagent container holder 32. The driving unit 50 includes a first driving unit 51 and a second driving unit 52.

The measuring unit 10 measures the sample by using the reagent stored in the reagent container 200. The reagent storage 20 stores the reagent container 200 storing the reagent. The reagent container holder 30 is arranged in the reagent storage 20 and can hold the reagent container 200. The fin 40 circulates air in the reagent storage 20.

The first reagent container holder 31 is formed in a circular shape. The first reagent container holder 31 can hold the multiple reagent containers 200. The second reagent container holder 32 is arranged around the first reagent container holder 31 in a plan view. That is, the second reagent container holder 32 is formed in a ring shape to surround the first reagent container holder 31 in a plan view. The first reagent container holder 31 and the second reagent container holder 32 are arranged concentrically and can be rotated independently from each other. Additionally, the first reagent container holder 31 and the second reagent container holder 32 are arranged at substantially the same height positions.

The first driving unit 51 drives the first reagent container holder 31 to rotate. The second driving unit 52 drives the second reagent container holder 32 to rotate. Additionally, the second driving unit 52 drives the fin 40 to rotate. That is, the second driving unit 52 is a single driving unit that drives both the second reagent container holder 32 and fin 40 to rotate. With this, there is no need to provide a separate driving unit that drives the fin 40 to rotate in addition to the second driving unit 52 that drives the second reagent container holder 32 to rotate, and thus there is no need to secure a space for such a driving unit. Consequently, it is possible to inhibit an enlargement of the apparatus. Additionally, since there is no need to provide a separate driving unit that drives the fin 40 to rotate, it is possible to simplify the apparatus configuration and also to inhibit an increase in the number of parts.

In the reagent container holder 30, multiple reagent container holders arranged in the form of triple or more circles may be provided.

Next, a method of circulating air in the reagent storage 20 executed by the sample measuring apparatus 100 of an embodiment is described simply. A method of circulating air in the reagent storage 20 includes the following steps (1) to (3).

(1) The reagent container holder 30 arranged in the reagent storage 20 and holding the reagent container 200 is rotated and driven.

(2) The fin 40 is rotated and driven in conjunction with the reagent container holder 30.

(3) Air in the reagent storage 20 is circulated by the rotation and driving of the fin 40.

In the method of circulating air in the reagent storage 20 of an embodiment, as described above, the fin 40 is rotated and driven in conjunction with the reagent container holder 30. With this, there is no need to provide a separate driving unit that drives the fin 40 to rotate in addition to the driving unit 50 that drives the reagent container holder 30 to rotate, and thus there is no need to secure a space for such a driving unit. Consequently, it is possible to provide the method of circulating air in the reagent storage 20 capable of inhibiting an enlargement of the apparatus. Additionally, since there is no need to provide a separate driving unit that drives the fin 40 to rotate, it is possible to provide the method of circulating air in the reagent storage 20 capable of simplifying the apparatus configuration and also inhibiting an increase in the number of parts.

[Specific Configuration Example of Sample Measuring Apparatus]

Next, a specific configuration example of the sample measuring apparatus 100 is described in details with reference to FIGS. 3 to 16. In the examples of FIGS. 3 to 16, the sample measuring apparatus 100 is an immune measuring apparatus that detects subject substances in the sample by using the antigen-antibody reaction.

The sample measuring apparatus 100 includes the measuring unit 10, the reagent storage 20, the reagent container holder 30, the fin 40, and the driving unit 50. Additionally, in the configuration example of FIG. 3, the sample measuring apparatus 100 includes a housing 110, a sample transport unit 120, a sample dispensing unit 130, a reaction container supply unit 140, a reaction container transfer unit 150, a reaction unit 160, a reagent container transfer unit 170, a BF separation unit 180, and a reagent dispensing unit 190. The measuring unit 10 includes a detection unit 11 and a control unit 12.

The housing 110 has a box shape that can store the units of the sample measuring apparatus 100 therein. The housing 110 may have a configuration in which the units of the sample measuring apparatus 100 are stored on a single layer or may have a layer configuration in which multiple layers are provided in a vertical direction to allocate and arrange the units of the sample measuring apparatus 100 on each layer.

The sample transport unit 120 is configured to transport the sample collected from the subject to an aspiration position of the sample dispensing unit 130. The sample transport unit 120 can transport a rack provided with multiple test tubes each storing the sample to a predetermined sample aspiration position.

The sample dispensing unit 130 aspirates the sample transported by the sample transport unit 120 and dispenses the aspirated sample into a reaction container 60. The sample dispensing unit 130 includes a pipette connected to a fluid circuit for performing aspiration and ejection and a movement mechanism for moving the pipette. The sample dispensing unit 130 attaches a dispensing tip set in a not-illustrated tip supply unit to a tip end of the pipette and aspirates a predetermined amount of the sample from the transported test tube into the dispensing tip. The sample dispensing unit 130 dispenses the aspirated sample into the reaction container 60 arranged at a predetermined sample dispensing position. After the dispensing, the sample dispensing unit 130 removes the dispensing tip from the tip end of the pipette and discards the dispensing tip.

The reaction container supply unit 140 stores multiple reaction containers 60. The reaction container supply unit 140 can supply the reaction container transfer unit 150 with the reaction containers 60 one by one at a predetermined reaction container supply position.

The reaction container transfer unit 150 transfers the reaction container 60. The reaction container transfer unit 150 obtains the reaction container 60 from the reaction container supply position and transfers the reaction container 60 to corresponding positions of processing of the sample dispensing unit 130, the reagent dispensing unit 190, the reaction unit 160, the detection unit 11, and so on. The reaction container transfer unit 150 includes a catcher that grabs the reaction container 60 or a holding portion having a hole in which the reaction container 60 is to be provided, and a movement mechanism that moves the catcher or the holding portion. The movement mechanism is moved in a direction of a single axis or directions of multiple axes by one or more linear motion mechanisms capable of moving linearly. The movement mechanism may include an arm mechanism that rotates horizontally about a rotational axis and an articulated robot mechanism. One or more reaction container transfer units 150 are provided.

The reaction unit 160 includes a heater and a temperature sensor and holds the reaction container 60 to heat the specimen stored in the reaction container 60 and to make a reaction. With the heating, the sample and the reagent stored in the reaction container 60 are reacted. One or more reaction units 160 are provided in the housing 110. Each reaction unit 160 may be provided to be fixed in the housing 110 or may be provided movably in the housing 110. When the reaction unit 160 is configured to be movable, the reaction unit 160 may function as a part of the reaction container transfer unit 150.

The reagent container transfer unit 170 can transfer the reagent container 200. For example, the reagent container transfer unit 170 can lift the reagent container 200 by a not-illustrated finned mechanism and set the reagent container 200 in the corresponding holding portion 33 of the reagent container holder 30.

The BF separation unit 180 has a function of executing BF separation processing for separating a liquid phase and a solid phase from the reaction container 60. The BF separation unit 180 includes one or more processing ports each can be provided with the reaction container 60. In the processing port, a magnetic source 182 (see FIG. 15) that collects magnetic particles contained in an R2-reagent and a cleaning unit 181 (see FIG. 15) that performs aspiration of a liquid phase and supplying of a cleaning liquid are provided. The BF separation unit 180 aspirates a liquid phase in the reaction container 60 and supplies the cleaning liquid by the cleaning unit 181 with the magnetic particles in which the later-described immune complexes are formed being collected. The cleaning unit 181 includes an aspiration channel of the liquid phase and an ejection channel of the cleaning liquid and is connected to the not-illustrated fluid circuit. With this, it is possible to separate unnecessary components contained in the liquid phase from the bound immune complex and magnetic particles and remove the unnecessary components.

The reagent dispensing unit 190 aspirates the reagent in the reagent container 200 and dispenses the aspirated reagent into the reaction container 60. The reagent dispensing unit 190 can move an aspiration tube 190a for performing aspiration and ejection of the reagent in a horizontal direction between a reagent aspiration position and a reagent dispensing position. Additionally, the reagent dispensing unit 190 can move the aspiration tube 190a downward to advance into the reagent container 200. Moreover, the reagent dispensing unit 190 can move the aspiration tube 190a upward to retract the aspiration tube 190a to an upper position of the reagent container 200. The aspiration tube 190a is connected with the not-illustrated fluid circuit, aspirates a predetermined amount of the reagent from the reagent container 200, and dispenses the reagent into the reaction container 60 transferred to the reagent dispensing position.

The aspiration tube 190a is connected to a liquid surface sensor. The liquid surface sensor is connected to the control unit 12. When the aspiration tube 190a aspirates the reagent from the reagent container 200, the liquid surface sensor detects a reagent liquid surface based on a change in capacitance due to a contact between the liquid surface of the reagent and the aspiration tube 190a and outputs the detection result to the control unit 12. Additionally, the control unit 12 monitors the operation amount of the reagent dispensing unit 190 to monitor the movement amount of the aspiration tube 190a in the vertical direction.

Three reagent dispensing units 190 are provided for dispensing of R1-reagent to R3-reagent, respectively, for example. A single reagent dispensing unit 190 may dispense multiple types of reagents. In the configuration example illustrated in FIG. 3, the reagent dispensing unit 190 includes a first reagent dispensing unit 191 that dispenses the R1-reagent, a second reagent dispensing unit 192 that dispenses the R2-reagent, and a third reagent dispensing unit 193 that dispenses the R3-reagent. Additionally, the reagent dispensing unit 190 includes a fourth reagent dispensing unit 194 that dispenses an R4-reagent and a fifth reagent dispensing unit 195 that dispenses an R5-reagent.

The first reagent dispensing unit 191 can move the aspiration tube 190a between a hole portion 21d on the most inner circumference side for aspirating the R1-reagent and a predetermined R1-reagent dispensing position. The second reagent dispensing unit 192 can move the aspiration tube 190a between a hole portion 21d on the most outer circumference side for aspirating the R2-reagent and a predetermined R2-reagent dispensing position. The third reagent dispensing unit 193 can move the aspiration tube 190a between a hole portion 21d in a radial middle position for aspirating the R3-reagent and a predetermined R3-reagent dispensing position. The fourth reagent dispensing unit 194 and the fifth reagent dispensing unit 195 are connected with reagent containers (not illustrated) storing the R4-reagent and the R5-reagent through liquid transfer tubes, respectively, and can eject the reagents into the reaction container 60 transferred by the reaction container transfer unit 150.

The detection unit 11 includes a light detector 11*a* (see FIG. 15) such as a photomultiplier tube. The detection unit 11 uses the light detector 11*a* to obtain light generated in a reaction process of a luminescent substrate with labeling antibodies bound to the antigens of the sample on which the various types of processing is performed and measures the amount of the antigens contained in the sample.

The control unit 12 includes a processor 12*a* such as a CPU and a storage unit 12*b* such as a ROM, a RAM, and a hard disk. The processor 12*a* functions as a control unit of the sample measuring apparatus 100 by executing a control program stored in the storage unit 12*b*. The control unit 12 controls operations of the above-described units of the sample measuring apparatus 100. Additionally, the control unit 12 measures the result detected by the detection unit 11.

Figure 3:
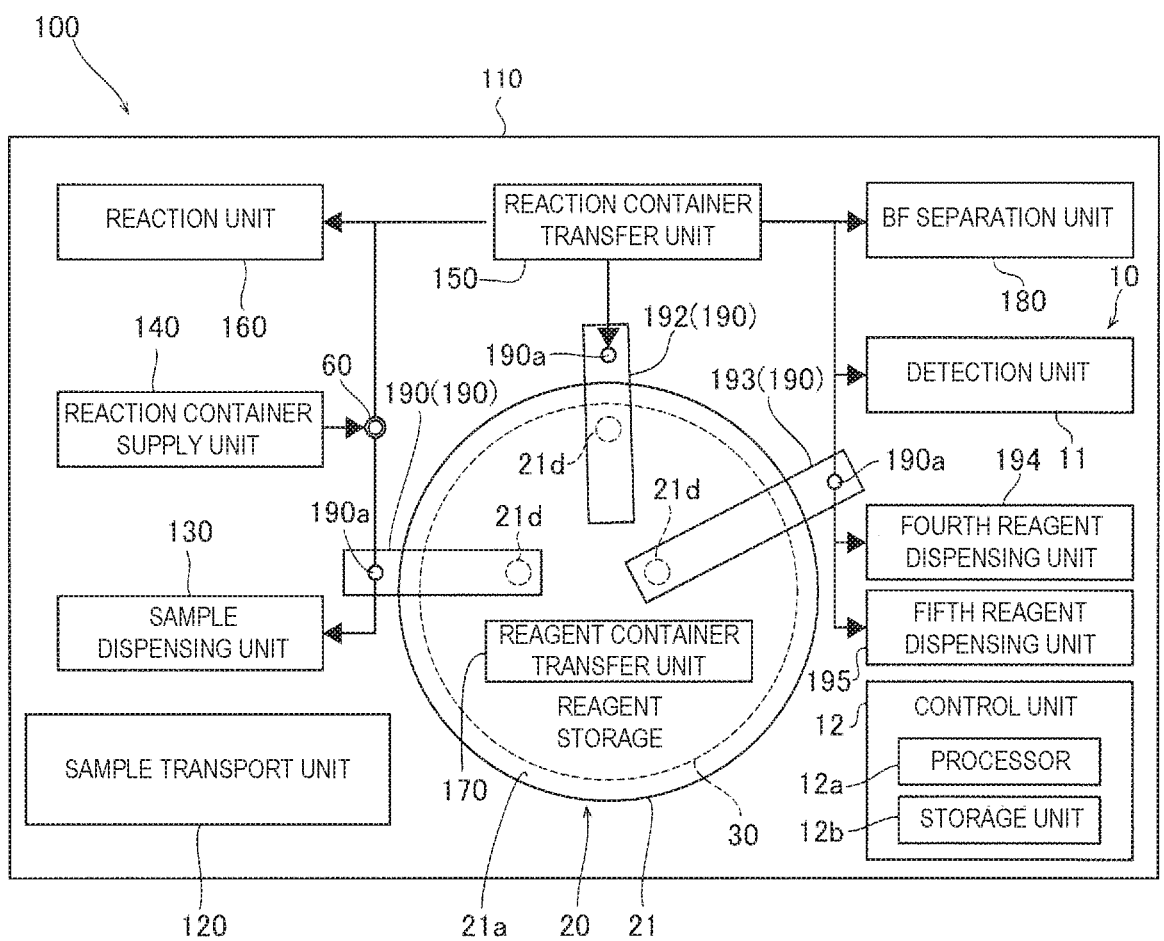
FIG. 3 is a schematic plan view illustrating a configuration example of a sample measuring apparatus.
Figure 4:
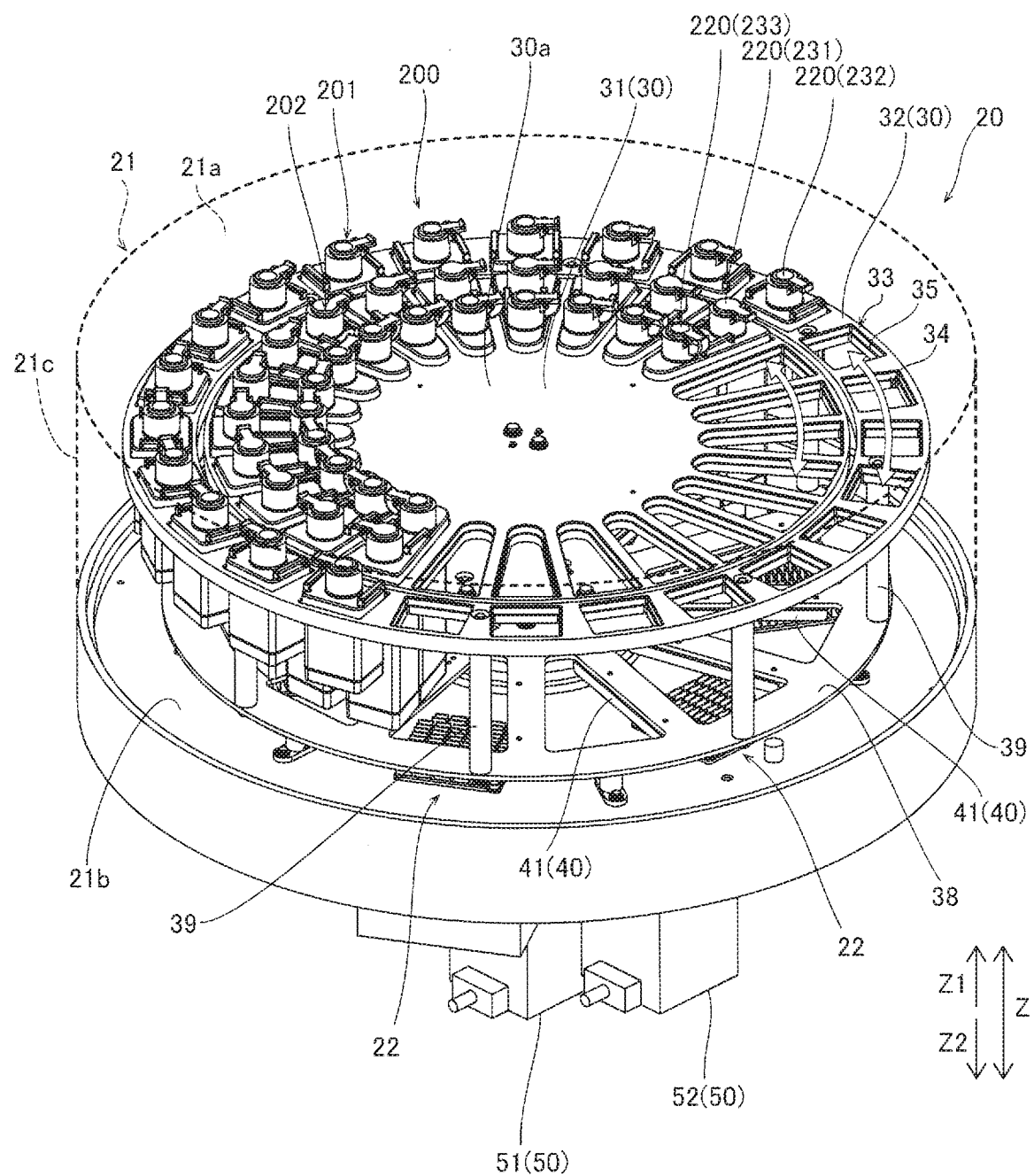
FIG. 4 is a perspective view illustrating a configuration example of a reagent storage.

In the configuration example of FIG. 3, the sample measuring apparatus 100 includes the box-shaped reagent storage 20 storing the reagent container holder 30. As illustrated in FIG. 4, the reagent container holder 30 is provided in a case 21 having a function of insulating heat of the reagent storage 20. The reagent storage 20 includes the reagent container holder 30 and a cooling unit 22 in the case 21 and keeps the reagent in the reagent container 200 set in the reagent container holder 30 cool at a constant temperature appropriate for storing. Additionally, the reagent storage 20 allows the reagent container holder 30 to be arranged in the reagent storage 20 so as to store the multiple reagent containers 200.

The case 21 includes an inner space defined by circular-shaped top surface portion 21*a* and bottom surface portion 21*b* and a cylindrical-shaped side surface portion 21*c*. The top surface portion 21*a*, the bottom surface portion 21*b*, and the side surface portion 21*c* include heat insulation materials to insulate heat of the inside and the outside of the case 21. For example, the top surface portion 21*a*, the bottom surface portion 21*b*, and the side surface portion 21*c* include foam materials. This makes it possible to store the reagent containers 200 at a low temperature.

The top surface portion 21*a* covers top portions of the reagent containers 200. The top surface portion 21*a* has a circular plate shape. Additionally, the top surface portion 21*a* has an outer circumference greater than an outer circumference of the reagent storage 20. The bottom surface portion 21*b* covers below the reagent containers 200. The bottom surface portion 21*b* has a circular plate shape. The side surface portion 21*c* covers side surfaces of the reagent containers 200. The side surface portion 21*c* has a cylindrical shape.

The reagent storage 20 includes the hole portion 21*d* that allows the reagent dispensing unit 190 to advance into the reagent storage 20. The hole portion 21*d* is provided in the top surface portion 21*a*. Additionally, multiple hole portions 21*d* are provided.

The cooling unit 22 cools air in the reagent storage 20. The cooling unit 22 includes a cooling source including the Peltier device or the like and a fin transmitting heat, for example. Additionally, multiple cooling units 22 are provided near the bottom surface portion 21*b* of the reagent storage 20. Air inside the reagent storage 20 is sent to the cooling units 22 by the fin 40, and the cooled air is circulated in the reagent storage 20.

Figure 5:
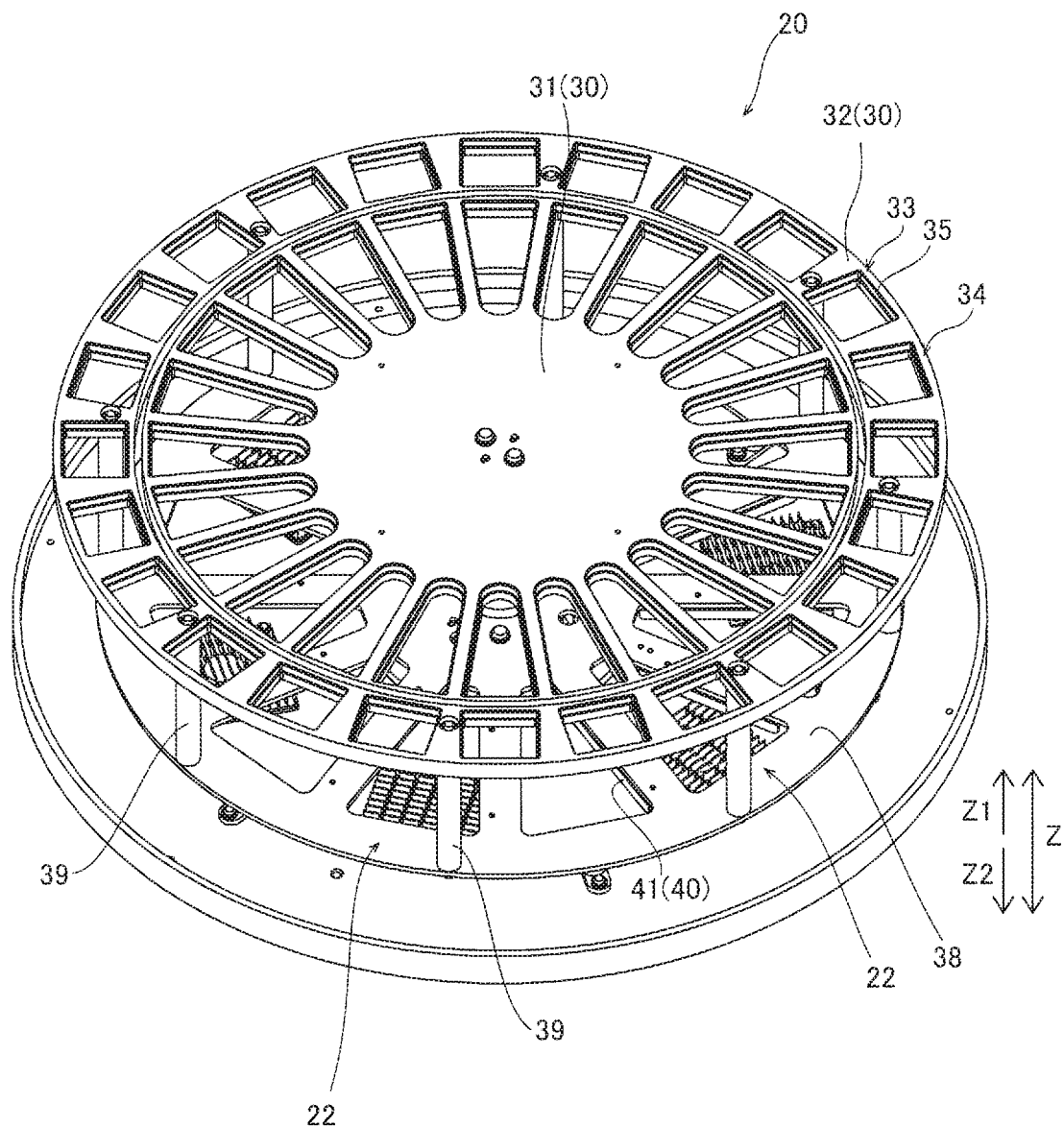
FIG. 5 is a perspective view illustrating a configuration example of a reagent container holder.
Figure 6:
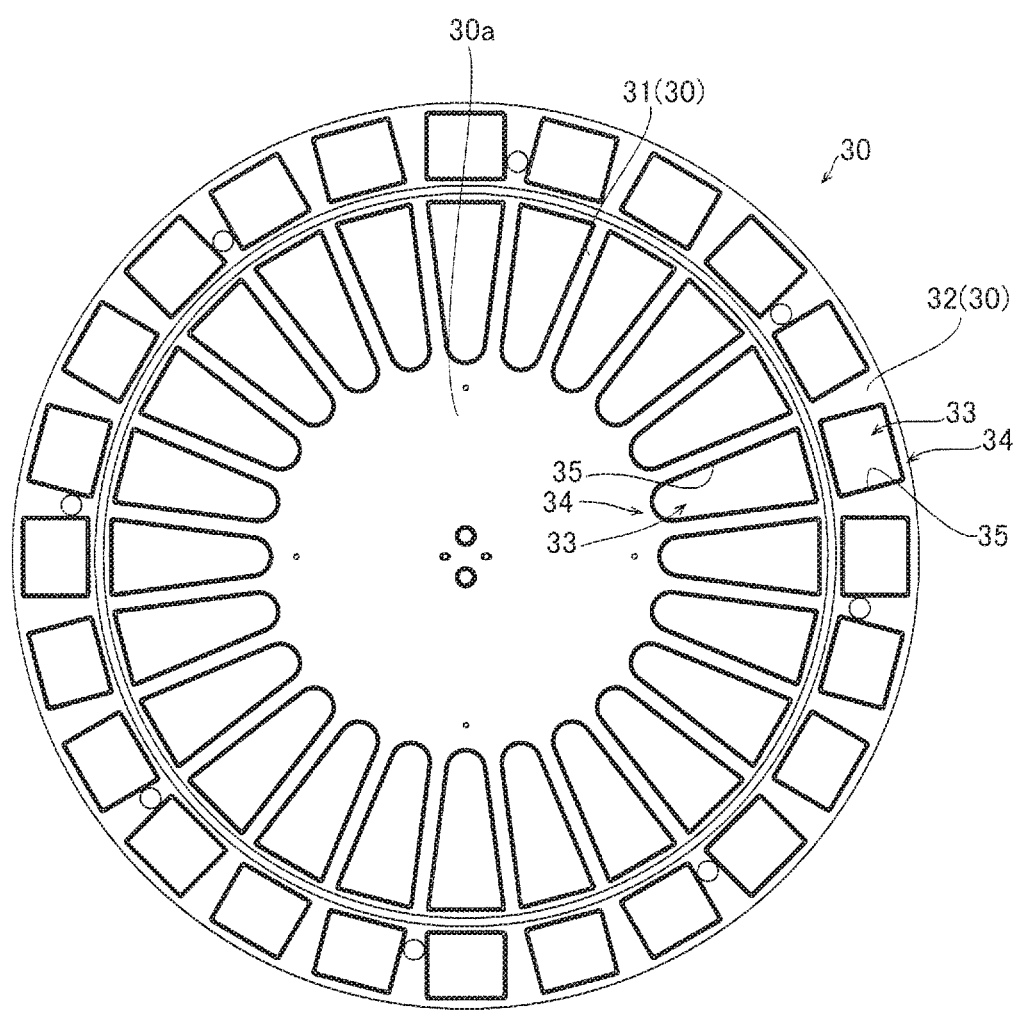
FIG. 6 is a plan view illustrating a configuration example of a reagent container holder.

The reagent container holder 30 can hold the multiple reagent containers 200. The reagent container holder 30 includes the multiple holding portions 33. Specifically, the reagent container holder 30 includes suspending portions 34 that suspend and hold the reagent containers 200. Additionally, the reagent container holder 30 has through-holes 35. Moreover, the reagent container holder 30 is formed to hold the multiple reagent containers 200 arranged in a circumferential direction. In the configuration example of FIG. 4, the reagent container holder 30 includes the first reagent container holder 31 and the second reagent container holder 32 as illustrated in FIGS. 5 and 6. Furthermore, the reagent container holder 30 includes a rotation table 38 and joint parts 39.

The reagent containers 200 are inserted and provided in the through-holes 35 of the reagent container holder 30. Specifically, the reagent container holder 30 includes a plate-shaped member 30*a* having the through-holes 35. Additionally, the plate-shaped member 30*a* holds each reagent container 200 to expose a bottom surface of the reagent container 200 from the through-hole 35. With this, it is possible to flow air in the reagent storage 20 by the reagent container 200 held by the reagent container holder 30 with the reagent container holder 30 rotated, and thus it is possible to circulate air in the reagent storage 20 in this way as well. Moreover, the plate-shaped member 30*a* includes multiple suspending portions 34 that suspend and hold the reagent containers 200. Furthermore, each suspending portion 34 has a shape tapered downward.

As illustrated in FIGS. 4 and 5, the reagent container holder 30 is formed in a flat shape extending horizontally. With this, it is possible to keep the reagents cool or warm efficiently and also to inhibit an increase in the number of parts.

The reagent container holder 30 positions and fixes the reagent containers 200 by the holding portions 33. With this, it is possible to arrange each reagent container 200 at a predetermined position in the reagent container holder 30 accurately and also to inhibit the reagent container 200 from moving with respect to the reagent container holder 30.

The reagent container holder 30 is formed such that the multiple reagent containers 200 are arranged circularly. Additionally, the reagent container holder 30 has a circular outer circumferential edge. With this, it is possible to arrange the multiple reagent containers 200 circularly in the substantially circular reagent container holder 30 and store the multiple reagent containers 200 in a depository compactly.

Moreover, the reagent container holder 30 is configured to hold each reagent container 200 such that side surfaces of the reagent container 200 are exposed to the inside of the reagent storage 20. With this, it is possible to flow air in the reagent storage 20 by the reagent container 200 held by the reagent container holder 30 with the reagent container holder 30 rotated, and thus it is possible to circulate air in the reagent storage 20 in this way as well.

Furthermore, the reagent container holder 30 is configured to suspend and hold the reagent container 200. With this, it is possible to support an upper portion of the reagent container 200, and thus it is possible to hold the reagent container 200 stably when the reagent is aspirated from the above.

Additionally, the first reagent container holder 31 of the reagent container holder 30 is formed in a circular shape.

Moreover, the second reagent container holder 32 is formed in a ring shape to surround the first reagent container holder 31 in a plan view. The first reagent container holder 31 and the second reagent container holder 32 are arranged concentrically and can be rotated independently from each other. Furthermore, the first reagent container holder 31 and the second reagent container holder 32 are arranged at substantially the same height positions.

The first reagent container holder 31 on the inner circumference side can hold the multiple reagent containers 200 circularly. The second reagent container holder 32 on the outer circumference side can hold the multiple reagent containers 200 circularly.

The reagent container holder 30 can be rotated and driven intermittently to agitate the reagent in the holding reagent container 200. That is, the reagent container holder 30 applies inertia to the reagent in the reagent container 200 and moves the reagent in the reagent container 200 by repeating acceleration and deceleration. With this, it is possible to agitate the reagent in the reagent container 200 efficiently.

For example, the reagent container 200 in which the reagent containing magnetic particles is set in the second reagent container holder 32. It is required to agitate the reagent constantly or periodically to inhibit precipitation of the magnetic particles. For this reason, the second reagent container holder 32 is rotated and driven constantly or periodically. As described later, the fin 40 is rotated and driven with the rotation and driving of the second reagent container holder 32, and thus it is possible to circulate air in the reagent storage 20 with the agitation of the reagent.

The fin 40 circulates air in the reagent storage 20. The fin 40 is rotated and driven by the driving unit 50 that drives the reagent container holder 30. In the configuration example of FIG. 3, the fin 40 is driven to rotate by the second driving unit 52 that drives the second reagent container holder 32 to rotate. That is, the second driving unit 52 is a single driving unit that drives both the reagent container holder 30 and fin 40 to rotate. With this, it is possible to inhibit an enlargement of the apparatus and an increase in the number of parts.

The fin 40 and the reagent container holder 30 are arranged such that a rotation shaft of the fin 40 and a rotation shaft of the reagent container holder 30 are the same. With this, since the rotation shaft of the reagent container holder 30 and the rotation shaft of the fin 40 can be commonalized, it is possible to simplify the apparatus configuration.

Specifically, the fin 40, the first reagent container holder 31, and the second reagent container holder 32 are arranged such that the rotation shaft of the fin 40, the rotation shaft of the first reagent container holder 31, and the rotation shaft of the second reagent container holder 32 are the same. With this, since the rotation shaft of the second reagent container holder 32 and the rotation shaft of the fin 40 can be commonalized, it is possible to simplify the apparatus configuration.

Additionally, the fin 40 driven by the driving unit 50 is configured to circulate the air cooled by the cooling unit 22. That is, the driving unit 50 drives the fin 40 to circulate the air cooled by the cooling unit 22. With this, since the fin 40 can circulate the air cooled by the cooling unit 22 in the reagent storage 20, it is possible to cool the inside of the reagent storage 20 efficiently.

Moreover, the fin 40 is configured to send air to the cooling unit 22. With this, the air cooled by the cooling unit 22 can be diffused in the reagent storage 20 by the blowing by the fin 40, and thus it is possible to cool the inside of the reagent storage 20 effectively.

The driving unit 50 drives the reagent container holder 30 to rotate. Additionally, the driving unit 50 drives the fin 40 to rotate. Specifically, the driving unit 50 includes the first driving unit 51 and the second driving unit 52. The first driving unit 51 drives the first reagent container holder 31 to rotate. The second driving unit 52 drives the second reagent container holder 32 to rotate. Moreover, the second driving unit 52 drives the fin 40 to rotate.

Figure 7:
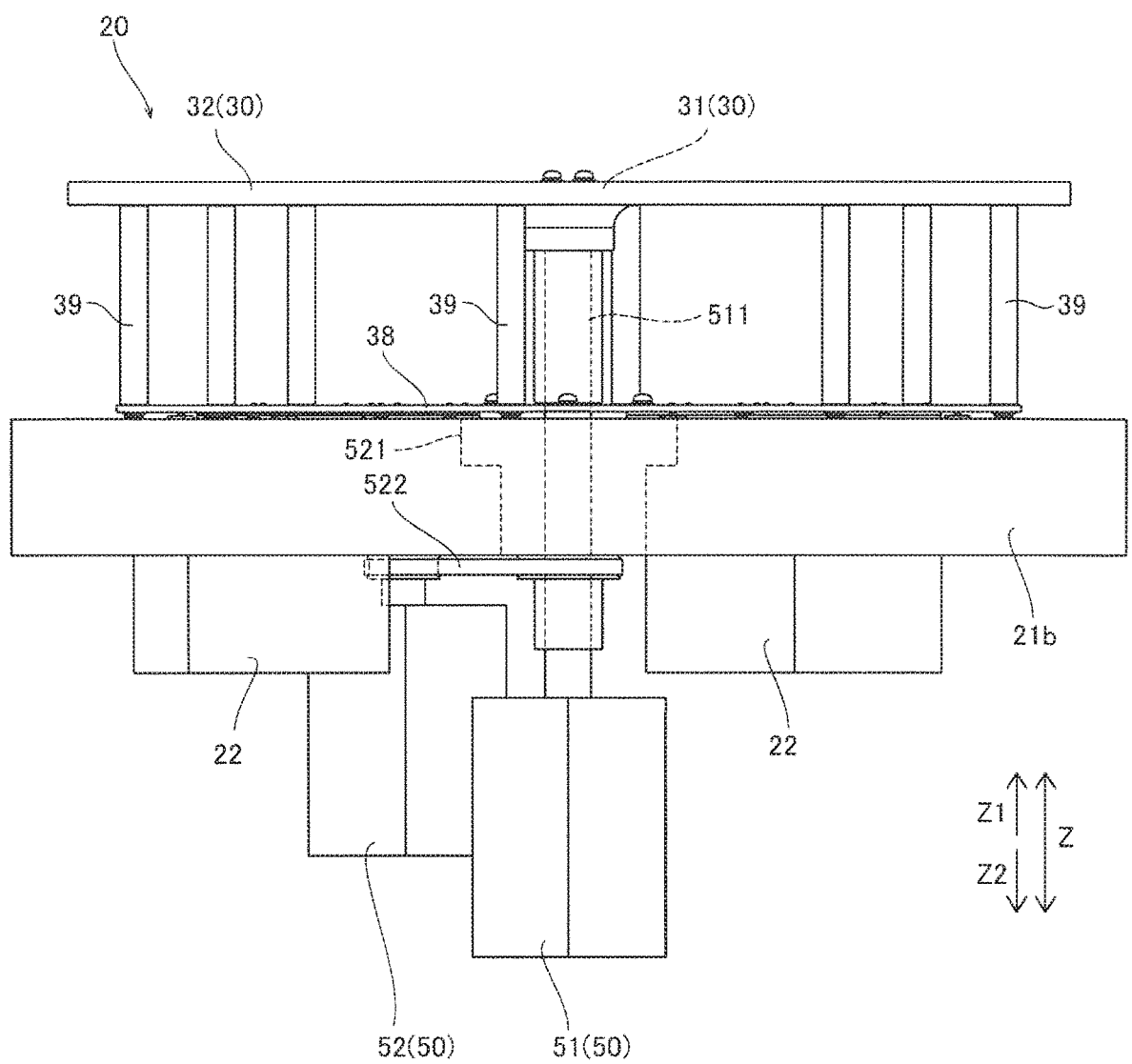
FIG. 7 is a side view illustrating a configuration example of a reagent container holder.

As illustrated in FIG. 7, the first driving unit 51 is arranged outside the reagent storage 20. Specifically, the first driving unit 51 is arranged outside and below the reagent storage 20. The first driving unit 51 rotates a rotation shaft 511. The rotation shaft 511 supports the first reagent container holder 31. That is, the first driving unit 51 drives the first reagent container holder 31 to rotate through the rotation shaft 511. The first driving unit 51 is a driving source such as a stepper motor or a servomotor, for example. Specifically, the first driving unit 51 rotates the first reagent container holder 31 by rotating and driving the rotation shaft 511 connected to the center of the first reagent container holder 31 and extending vertically. In the rotation shaft 511, a lower end portion is joined to the first driving unit 51, and an upper end portion is joined to the center of the first reagent container holder 31.

Thus, it is possible to rotate and move the first reagent container holder 31 easily by the first driving unit 51 arranged outside the reagent storage 20. Additionally, with the first driving unit 51 provided outside the reagent storage 20, it is possible to inhibit the first driving unit 51 from interfering the reagent containers 200 held by the first reagent container holder 31 and also to inhibit transmission of heat of the first driving unit 51 to the inside of the reagent storage 20.

The second driving unit 52 is arranged outside the reagent storage 20. Specifically, the second driving unit 52 is arranged outside and below the reagent storage 20. The second driving unit 52 rotates a supporting unit 521. The supporting unit 521 supports the rotation table 38. The rotation table 38 supports the second reagent container holder 32 through the multiple joint parts 39. That is, the second driving unit 52 drives the second reagent container holder 32 to rotate through the supporting unit 521, the rotation table 38, and the joint parts 39. The second driving unit 52 is a driving source such as a stepper motor or a servomotor, for example. Specifically, the second driving unit 52 rotates the second reagent container holder 32 by rotating and driving the rotation table 38 joined to the second reagent container holder 32 through a transmission mechanism 522. The rotation table 38 is joined to the transmission mechanism 522 through coupling and the supporting unit 521. In the rotation table 38 and the supporting unit 521, through-holes to allow the rotation shaft 511 to pass therethrough are provided in the centers and are rotated independently from the rotation shaft 511. With this, the second driving unit 52 and the first driving unit 51 rotate and move independently the second reagent container holder 32 on the outer circumference side and the first reagent container holder 31 on the inner circumference side, respectively.

Thus, the second reagent container holder 32 can be rotated and moved independently from the first reagent container holder 31. Additionally, with the second driving unit 52 provided outside the reagent storage 20, it is possible to inhibit the second driving unit 52 from interfering the reagent container 200 held by the second reagent container holder 32 and also to inhibit transmission of heat of the second driving unit 52 to the inside of the reagent storage 20.

Figure 8:
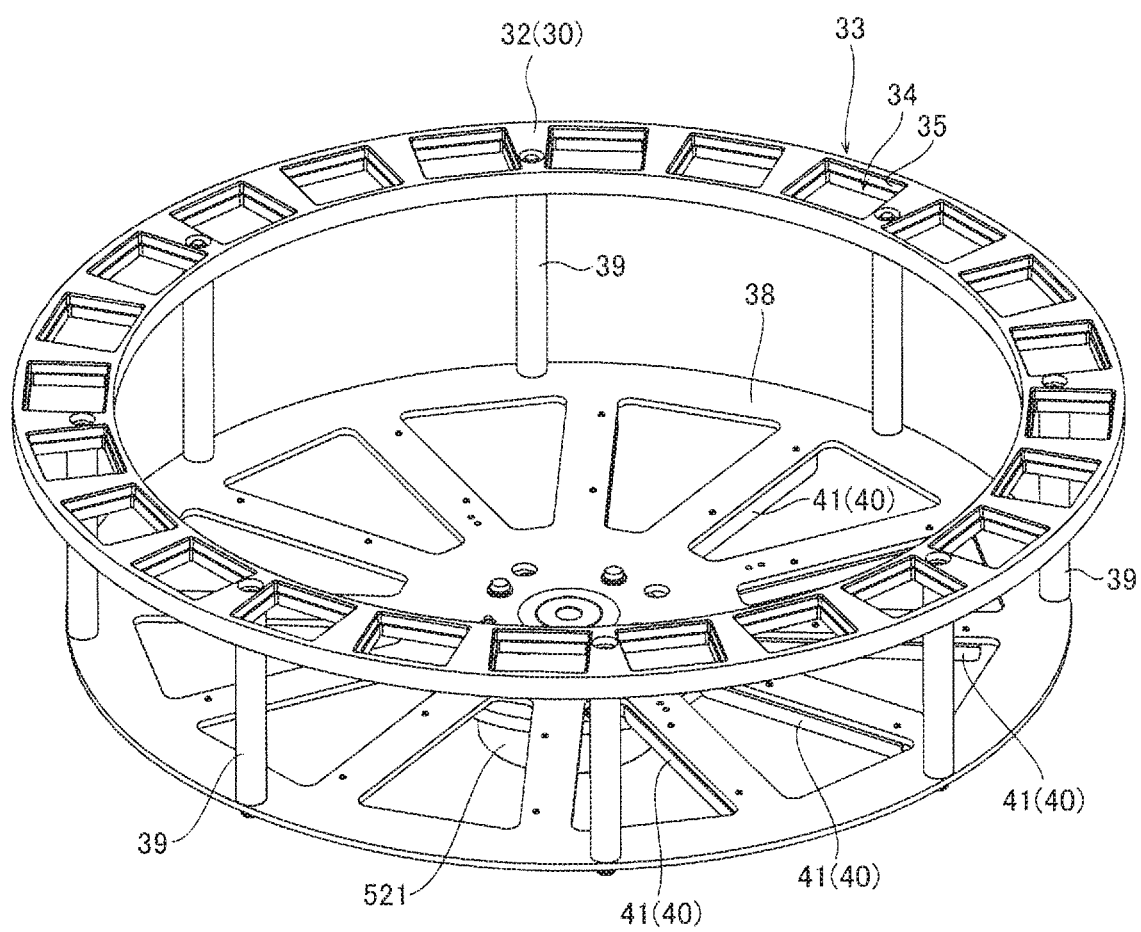
FIG. 8 is a top perspective view illustrating a configuration example of a rotation table.
Figure 9:
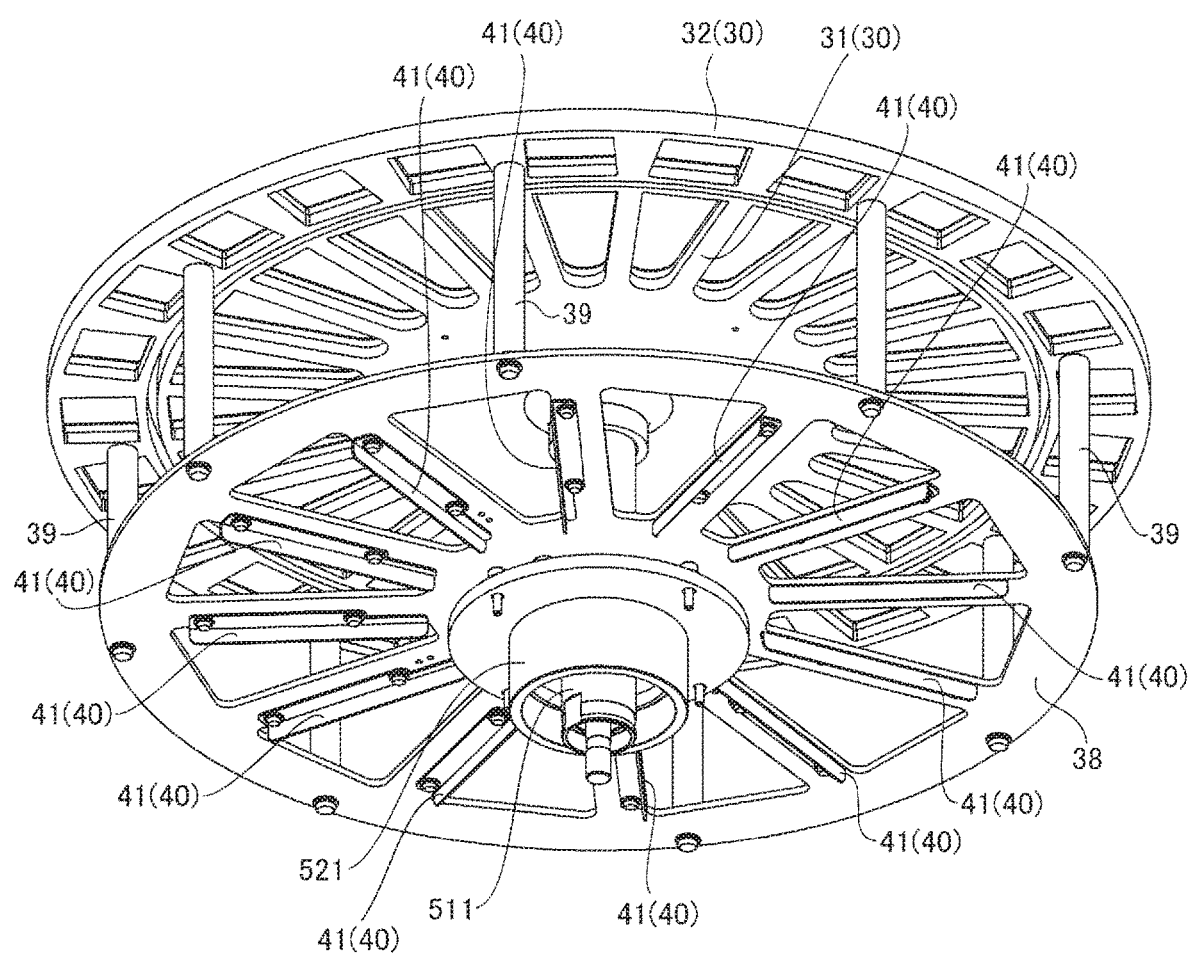
FIG. 9 is a bottom perspective view illustrating a configuration example of a rotation table.
Figure 10:
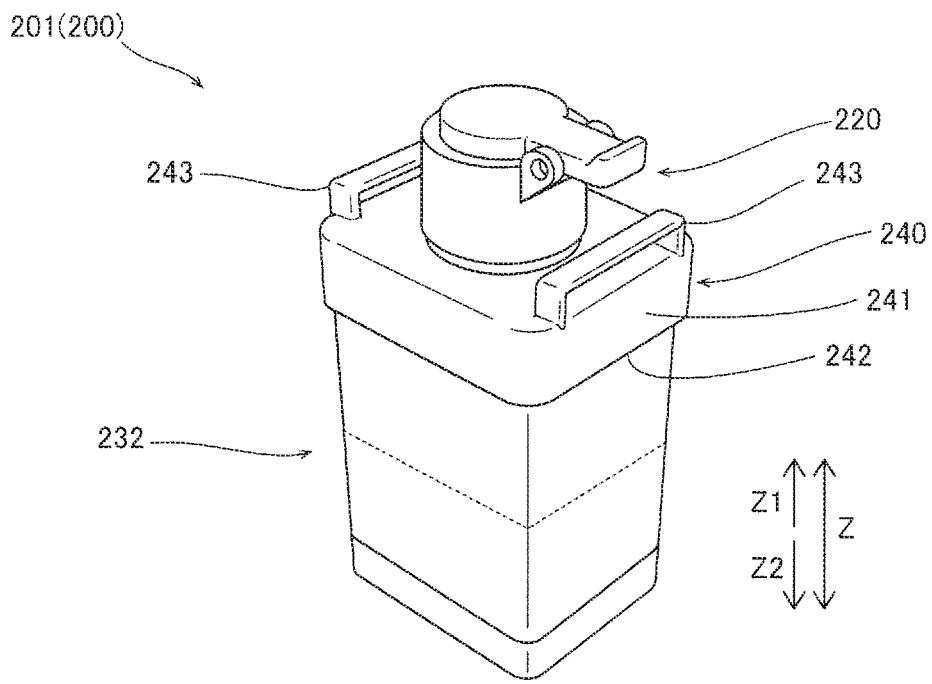
FIG. 10 is a perspective view illustrating a reagent container storing an R2-reagent.
Figure 11:
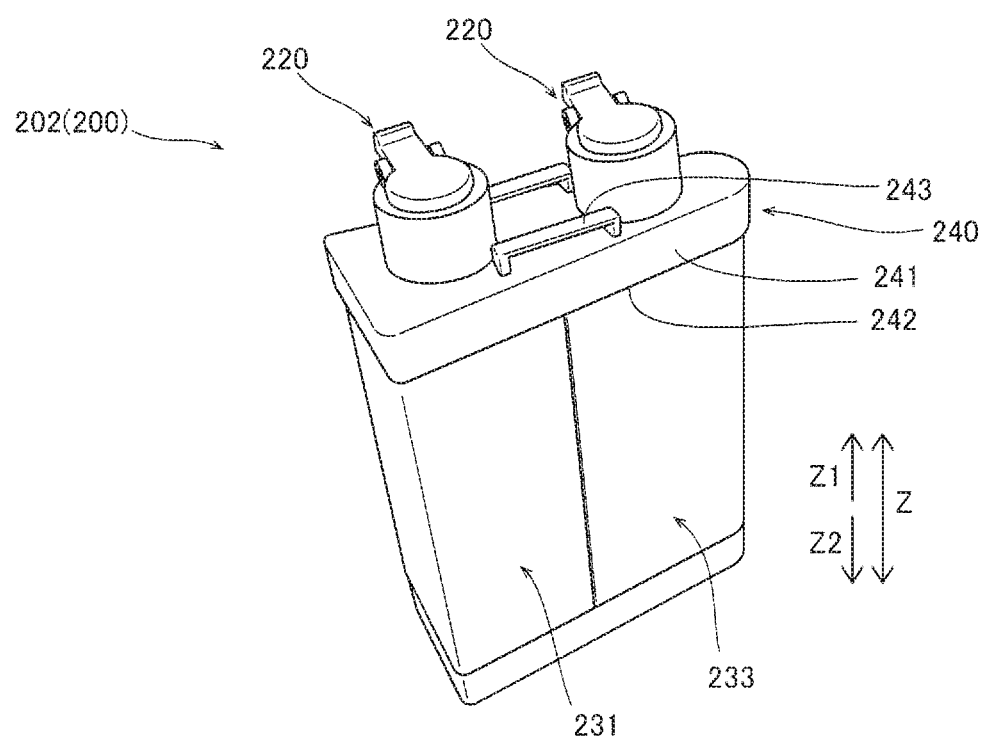
FIG. 11 is a perspective view illustrating a reagent container storing an R1-reagent and an R3-reagent.

As illustrated in FIGS. 8 and 9, the fin 40 is provided with the rotation table 38. That is, the fin 40 is provided with the rotation table 38 supporting the second reagent container holder 32 through the joint parts 39. Thus, since the fin 40 can be provided with the rotation table 38 supporting the reagent container holder 30, there is no need to provide an additional space to provide the fin 40. With this, it is possible to simplify the apparatus configuration and to miniaturize the apparatus.

Additionally, the rotation table 38 has an outer circumferential edge that is substantially circular in a plan view. Moreover, the rotation table 38 is provided near a lower side of the reagent storage 20. Multiple openings are provided in the rotation table 38, and air easily passes between a region below the rotation table 38 and a region above the rotation table 38.

Furthermore, the fin 40 includes a protrusion 41 provided integrally with the rotation table 38. With this, the protrusion 41 is rotated with the rotation of the rotation table 38, and thus it is possible to generate a flow of air in the reagent storage 20 along with the rotational movement of the reagent container holder 30.

In the configuration example illustrated in FIGS. 8 and 9, the protrusion 41 is provided on a lower surface of the rotation table 38. That is, the protrusion 41 is formed to protrude downward with respect to the rotation table 38. Additionally, the protrusion 41 is configured to generate a downflow by the rotation of the rotation table 38. That is, the protrusion 41 generates an airflow toward the cooling unit 22 provided below the rotation table 38. The protrusion 41 may be provided on an upper surface of the rotation table 38. Moreover, the protrusion 41 may be provided on an outer circumferential surface of the rotation table 38. The protrusion 41 may have a wing shape that flows air in the reagent storage 20. The protrusion 41 is arranged to extend along a radial direction of the rotation table 38. That is, the protrusion 41 is arranged to extend in a direction crossing a rotation direction of the rotation table 38.

The rotation table 38 is rotated and driven at a rotation speed of ten to several tens of rpm. That is, the fin 40 rotated and driven with the rotation table 38 is rotated and driven at a rotation speed of ten to several tens of rpm.

The protrusion 41 may be attached to the rotation table 38 by being fastened with a screw and the like or may be formed integrally with the rotation table 38. Additionally, the protrusion 41 may protrude in a vertical direction with respect to the rotation table 38 or may protrude while inclining with respect to the vertical direction. Moreover, multiple protrusions 41 are provided. A single protrusion 41 may be provided.

The reagent container 200 includes a reagent container 201 and a reagent container 202. In the configuration examples illustrated in FIGS. 10 and 11, the reagent container 201 includes the later-described container main body 232 storing the R2-reagent. The reagent container 202 is a multiply-joined type reagent container in which the later-described container main body 233 storing the R3-reagent and container main body 231 storing the R1-reagent are joined with each other as a pair.

The reagent container 201 and the reagent container 202 each include a top cover 240 covering the top of the container main body. The top cover 240 includes an outer circumference portion 241 along a side surface of the container main body to cover a part of the side surface of the container main body, and an engagement portion 242 is provided at a lower end portion of the outer circumference portion 241 to be engaged with the reagent container holder 30. The engagement portion 242 is supported by the holding portion 33 of the reagent container holder 30. In the configuration examples of FIGS. 10 and 11, the top cover 240 includes a grabbed portion 243. Moreover, the top cover 240 is provided with an openable/closable lid portion 220.

In the configuration example of FIG. 4, the lid portion 220 of each of the multiple reagent containers 201 arranged and held in the circumferential direction is arranged circularly in the same way. Each of the multiple reagent containers 202 arranged and held in the circumferential direction is arranged circularly in the same way. The container main bodies 231 and 233 of each of the multiple reagent containers 202 arranged and held in the circumferential direction are each arranged circularly in the same way. In the reagent container holder 30, the container main body 232, the container main body 233, and the container main body 231 are arranged at radially different positions, respectively. Consequently, as illustrated in FIG. 3, in the top surface portion 21a of the case 21, the hole portions 21d corresponding to the aspiration positions of the R1-reagent to the R3-reagent are provided at three parts so as to be overlapped with predetermined positions on the circle on which the corresponding lid portions 220 of the reagent containers 200 are arranged.

Figure 12:
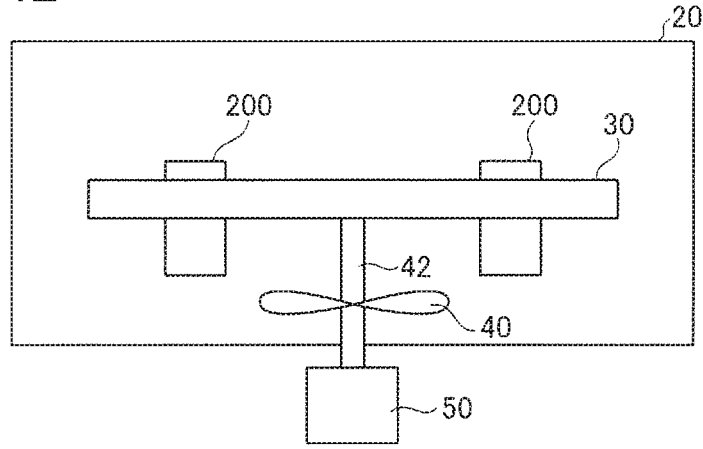
FIG. 12 is a side view illustrating another first example of a fin.

As illustrated in FIG. 12, the fin 40 may be provided with a transmission shaft 42 that transmits the rotation and driving of the driving unit 50 to the reagent container holder 30. With this, the fin 40 is rotated with the rotation of the transmission shaft 42, and thus it is possible to generate a flow of air in the reagent storage 20 along with the rotational movement of the reagent container holder 30.

Figure 13:
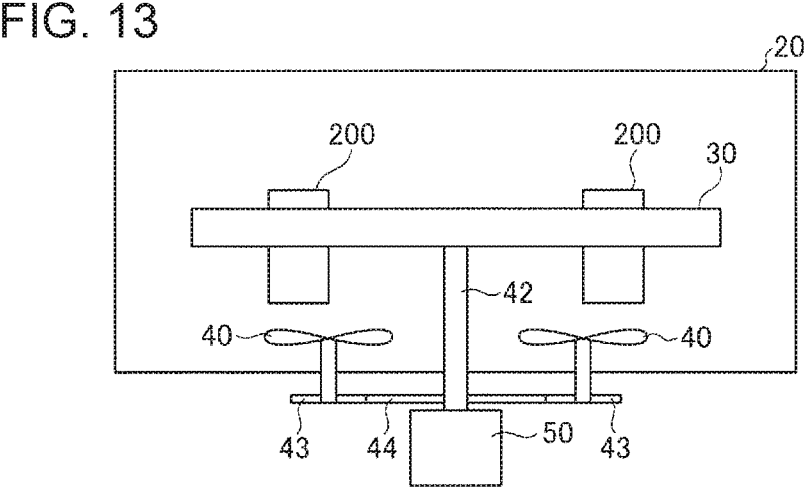
FIG. 13 is a side view illustrating another second example of a fin.
Figure 14:
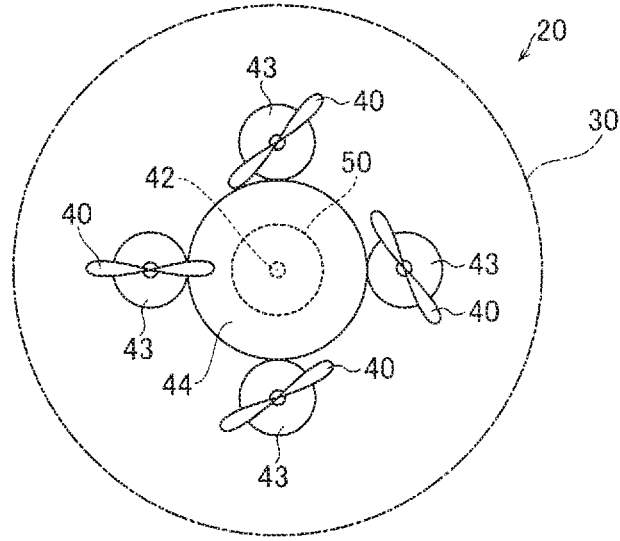
FIG. 14 is a plan view illustrating another second example of a fin.

Additionally, as illustrated in FIGS. 13 and 14, the fin 40 may be arranged at a position different from a position on a rotational axis of the reagent container holder 30 in a plan view. The fin 40 is connected to the driving unit 50 through gears 43 and 44 and the transmission shaft 42. The rotational axis of the fin 40 is offset from the transmission shaft 42 in a plan view. Moreover, the number of teeth of the gear 43 is smaller than the number of teeth of the gear 44. With this, the rotation and driving of the transmission shaft 42 are transmitted to the fin 40 while the speed of the rotation and driving of the transmission shaft 42 is increased. Consequently, it is possible to increase the number of rotation of the fin 40 with respect to the reagent container holder 30. Furthermore, in the configuration example illustrated in FIGS. 13 and 14, four fins 40 are provided. Three or less fins 40 may be provided, or five or more fins 40 may be provided.

(Overview of Immune Measuring)

In the configuration examples illustrated in FIGS. 3 to 14, the immune measuring is performed using the R1-reagent to the R5-reagent as described above. An example in which subject substances 81 are hepatitis B surface antigens (HBsAg) is described with reference to FIG. 15 as an example of the immune measuring.

First, a sample containing the subject substances 81 and the R1-reagent are dispensed into the reaction container 60. The first reagent dispensing unit 191 dispenses the R1-reagent into the reaction container 60, and the sample dispensing unit 130 dispenses the sample into the reaction container 60. The R1-reagent contains capture substances 84 and is reacted with and bound to the subject substances 81. The capture substances 84 contain binging substances to allow the capture substances 84 to be bound to solid-phase carriers 82 contained in the R2-reagent.

It is possible to use combinations such as biotin and the avidin family, a hapten and an anti-hapten antibody, nickel and histigine tag, and glutathione and glutathione-S-transferase for the binding of the binding substances and the solid-phase carriers, for example. The "avidin family" means that avidin and streptavidin are included.

For example, the capture substances 84 are antibodies modified with biotin (biotin antibodies). That is, the capture substances 84 are modified with biotin as the binding substances. After the dispensing of the sample and the R1-reagent, the specimen in the reaction container 60 is heated to a predetermined temperature in the reaction unit 160, and thus the capture substances 84 and the subject substances 81 are bound.

Next, the second reagent dispensing unit 192 dispenses the R2-reagent into the reaction container 60. The R2-reagent contains the solid-phase carriers 82. The solid-phase carriers 82 are bound to the binding substances of the capture substances 84. The solid-phase carriers 82 are magnetic particles (StAvi-bound magnetic particles) to which streptavidin to be bound to biotin is fixed, for example. The streptavidin of the StAvi-bound magnetic particles is reacted with and bound to biotin as the binding substances. After the dispensing of the R2-reagent, the specimen in the reaction container 60 is heated to a predetermined temperature in the reaction unit 160. Consequently, the subject substances 81 and the capture substances 84 are bound to the solid-phase carriers 82.

The subject substances 81 and the capture substances 84 formed on the solid-phase carriers 82 and unreacted capture substances 84 are separated from each other by primary BF separation processing by the BF separation unit 180. Once the reaction container 60 is set in the processing port of the BF separation unit 180, the BF separation unit 180 executes one or more times each of the processes of aspirating the liquid phase by the cleaning unit 181 and ejecting the cleaning liquid while the magnetic particles are collected by the magnetic source 182 and agitating while no magnetic particles are collected. Unnecessary components such as the unreacted capture substances 84 are removed from the reaction container 60 by the primary BF separation processing. In the primary BF separation processing, the liquid phase in the reaction container 60 is aspirated eventually, and the process proceeds to the next process.

Figure 15:
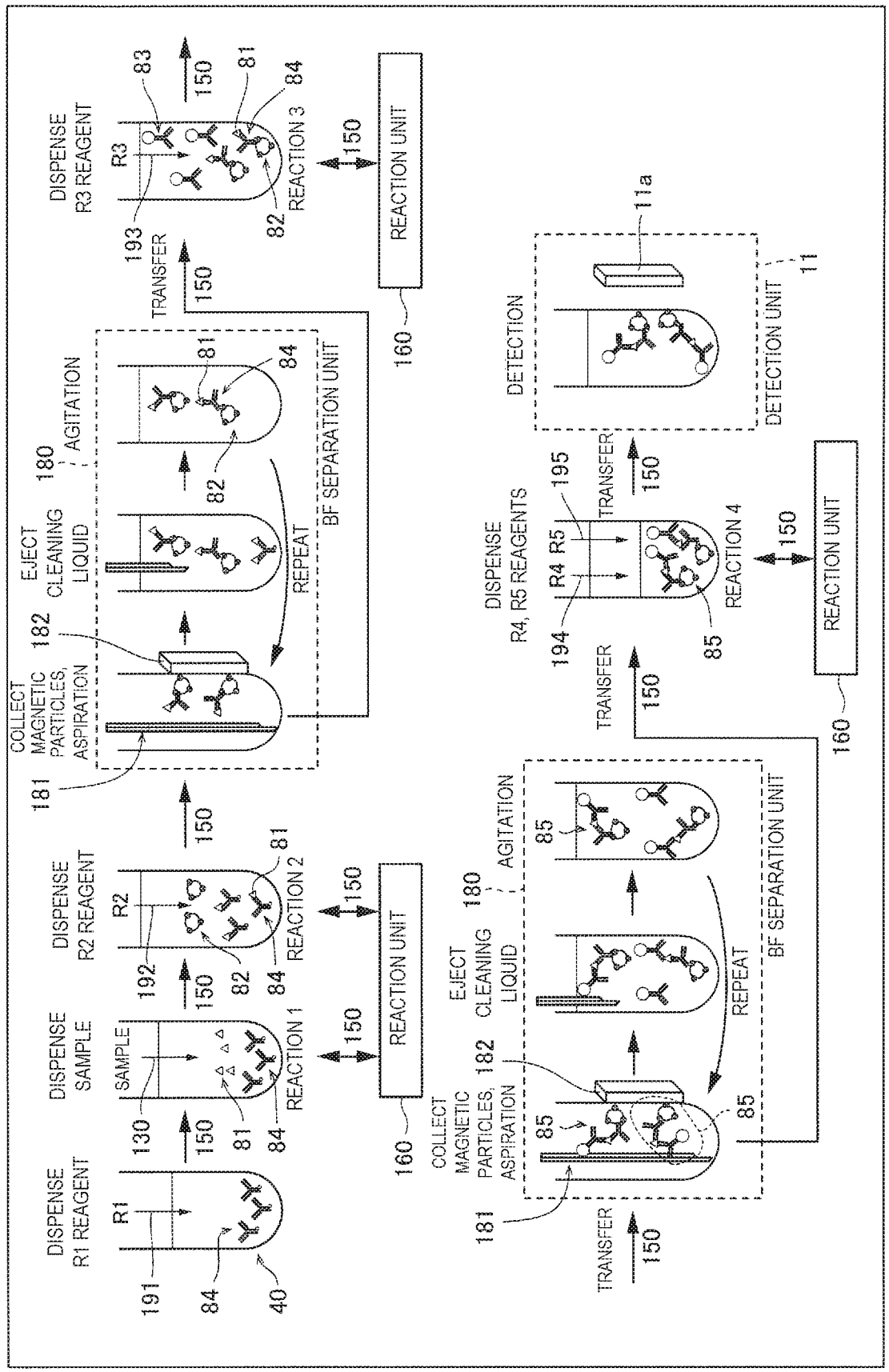
FIG. 15 is a diagram illustrating measurement processing of a sample measuring apparatus.

Next, the third reagent dispensing unit 193 dispenses the R3-reagent into the reaction container 60. The R3-reagent contains labeling substances 83 and is reacted with and bound to the subject substances 81. After the dispensing of the R3-reagent, the specimen in the reaction container 60 is heated to a predetermined temperature in the reaction unit 160. Consequently, an immune complex 85 containing the subject substance 81, the labeling substance 83, and the capture substance 84 is formed on each solid-phase carrier 82. In the example of FIG. 15, the labeling substances 83 are ALP (alkaline phosphatase) labeling antibodies.

The immune complexes 85 formed on the solid-phase carriers 82 and unreacted labeling substances 83 are separated from each other by secondary BF separation processing. The BF separation unit 180 executes one or more times each of the processes of aspirating the liquid phase and ejecting the cleaning liquid while the magnetic particles are collected by the magnetic source 182 and agitating while no magnetic particles are collected. Unnecessary components such as the unreacted labeling substances 83 are removed from the reaction container 60 by the secondary BF separation processing. In the secondary BF separation processing, the liquid phase in the reaction container 60 is aspirated eventually, and the process proceeds to the next process.

Thereafter, the fourth reagent dispensing unit 194 and the fifth reagent dispensing unit 195 dispense the R4-reagent and the R5-reagent into the reaction container 60, respectively. The R4-reagent contains a buffer solution. The immune complexes 85 bound to the solid-phase carriers 82 are dispersed in the buffer solution. The R5-reagent contains a chemiluminescent substrate. The buffer solution contained in the R4-reagent has a composition that promotes the reaction between labels (enzymes) of the labeling substances 83 contained in the immune complexes 85 and the substrate. After the dispensing of the R4 and R5-reagents, the specimen in the reaction container 60 is heated to a predetermined temperature in the reaction unit 160. With the substrate reacted with the labels, light is generated, and the intensity of the generated light is measured by the light detector 11a of the detection unit 11. Based on a detection signal of the detection unit 11, the control unit 12 measures the contained amount of the subject substances 81 in the sample.

(Description of Measurement Processing Operation)

Figure 16:
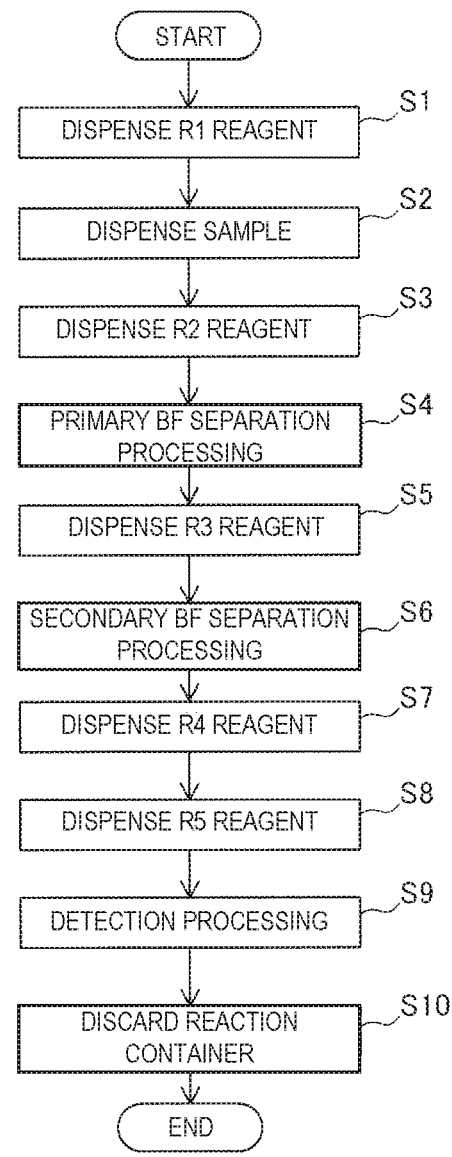
FIG. 16 is a flow diagram illustrating a measurement processing, such as in FIG. 15.
Figure 17:
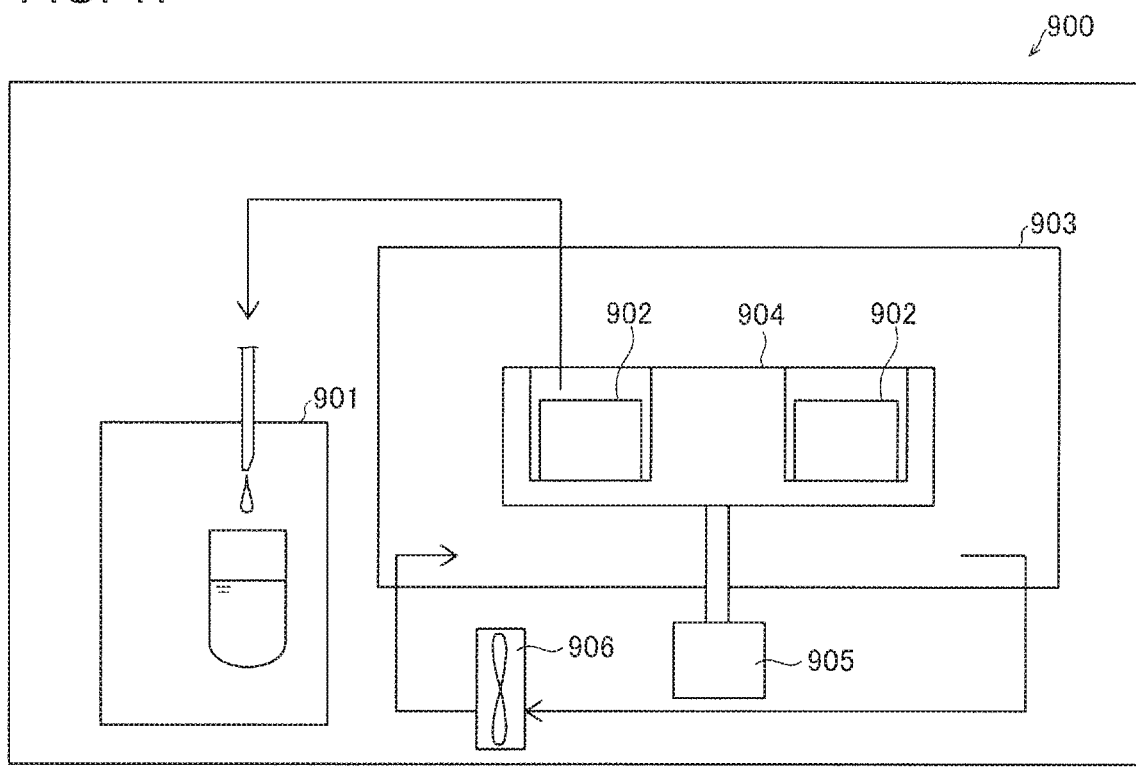
FIG. 17 is a diagram illustrating a conventional technique.

Next, the measurement processing operation of the sample measuring apparatus 100 illustrated in FIG. 15 is described with reference to FIG. 16. Additionally, the processing of each step illustrated in FIG. 16 is controlled by the control unit 12.

In step S1, the control unit 12 causes the reaction container transfer unit 150 to transfer the reaction container 60 to the R1-reagent dispensing position. The control unit 12 causes the first reagent dispensing unit 191 to dispense the R1-reagent into the reaction container 60.

Furthermore, the fin 40 includes a protrusion 41 provided integrally with the rotation table 38. With this, the protrusion 41 is rotated with the rotation of the rotation table 38, and thus it is possible to generate a flow of air in the reagent storage 20 along with the rotational movement of the reagent container holder 30. That is, the fin 40 and protrusion 41 may provide a fan-like (e.g., air moving) function or may be constituted to more closely resemble a fan-like mechanism in embodiments (e.g. fin 40 and protrusion 41 may be angled to increase air flow). However, it will be appreciated that being embodied as disclosed, the fin 40 and protrusion 41 may achieve a fan-like function without the need for and added cost of a separate fan.

In step S3, the control unit 12 causes the reaction container transfer unit 150 to transfer the reaction container 60 to the R2-reagent dispensing position and causes the second reagent dispensing unit 192 to dispense the R2-reagent into the reaction container 60. After the dispensing of the R2-reagent, the control unit 12 causes the reaction container transfer unit 150 to transfer the reaction container 60 to the reaction unit 160. The reaction container 60 is heated for a predetermined period of time in the reaction unit 160.

In step S4, the control unit 12 causes the BF separation unit 180 to execute the primary BF separation processing. First, the control unit 12 causes the reaction container transfer unit 150 to transfer the reaction container 60 to the BF separation unit 180. The BF separation unit 180 is controlled to perform the primary BF separation processing (see FIG. 15) on the specimen in the reaction container 60 and remove the liquid components.

In step S5, the control unit 12 causes the reaction container transfer unit 150 to transfer the reaction container 60 to the R3-reagent dispensing position and causes the third reagent dispensing unit 193 to dispense the R3-reagent into the reaction container 60. After the dispensing of the R3-reagent, the control unit 12 causes the reaction container transfer unit 150 to transfer the reaction container 60 to the reaction unit 160. The reaction container 60 is heated for a predetermined period of time in the reaction unit 160.

In step S6, the control unit 12 causes the BF separation unit 180 to execute the secondary BF separation processing. First, the control unit 12 causes the reaction container transfer unit 150 to transfer the reaction container 60 to the BF separation unit 180. The BF separation unit 180 is controlled to perform the secondary BF separation processing (see FIG. 15) on the specimen in the reaction container 60 and remove the liquid components.

In step S7, the R4-reagent is dispensed into the reaction container 60. The control unit 12 causes the reaction container transfer unit 150 to transfer the reaction container 60 to the R4-reagent dispensing position and causes the fourth reagent dispensing unit 194 to dispense the R4-reagent into the reaction container 60.

In step S8, the R5-reagent is dispensed into the reaction container 60. The control unit 12 causes the reaction container transfer unit 150 to transfer the reaction container 60 to the R5-reagent dispensing position and causes the fifth reagent dispensing unit 195 to dispense the R5-reagent into the reaction container 60. After the dispending of the R5-reagent, the control unit 12 causes the reaction container transfer unit 150 to transfer the reaction container 60 to the reaction unit 160. The reaction container 60 is heated for a predetermined period of time in the reaction unit 160.

In step S9, the processing of detecting the immune complexes 85 is performed. The control unit 12 causes the reaction container transfer unit 150 to transfer the reaction container 60 to the detection unit 11. The detection unit 11 measures the intensity of the light generated by making the substrate react with the labels. The detection result of the detection unit 11 is outputted to the control unit 12.

After the detection is done, in step S10, the reaction container transfer unit 150 is controlled to take out the reaction container 60 done with the measurement processing from the detection unit 11 and discard the reaction container 60 to the not-illustrated discard port.

As described above, the measurement processing operation by the sample measuring apparatus 100 is performed.

It should be construed that the embodiments disclosed herein are examples and not limitative at all points. The scope of the present invention is indicated by not the above descriptions of the embodiments but by the scope of claims, and also all the changes within the scope of claims and the meaning and scope of equivalent are included therein.

REFERENCE SIGNS LIST

10: measuring unit
20: reagent storage
22: cooling unit
30: reagent container holder
30a: plate-shaped member
31: first reagent container holder
32: second reagent container holder
34: suspending portion
35: through-hole
38: rotation table
39: joint part
40: fin
41: protrusion
42: transmission shaft
50: driving unit
51: first driving unit
52: second driving unit
100, 101: sample measuring apparatus
200: reagent container
521: supporting unit

The invention claimed is:

1. A sample measuring apparatus comprising:
    a measuring unit that measures a sample by using a reagent stored in a reagent container;
    a reagent storage that includes a case defining an inner space that stores the reagent container;
    a reagent container holder arranged in the reagent storage and that holds the reagent container;
    a rotation table that is arranged in the inner space of the reagent storage and that supports the reagent container holder;
    a fin that is arranged in the inner space of the reagent storage and is provided as attached to an underside of the rotation table and that circulates air in the reagent storage; and
    a driving unit including a motor that drives the rotation table provided with the fin to rotate so as to circulate, by the fin, the air in the reagent storage, wherein
    the rotation table includes multiple openings and is provided with the fin such that the air passes through the multiple openings between a region below the rotation table and a region above the rotation table.

2. The sample measuring apparatus according to claim 1, further comprising:
    a cooling unit that comprises a cooling source that cools the air in the reagent storage, wherein
    the driving unit drives the rotation table provided with the fin to rotate to circulate, by the fin, the air cooled by the cooling unit.

3. The sample measuring apparatus according to claim 1, wherein
    the fin and the reagent container holder are arranged such that a rotation axis of the rotation table provided with the fin and a rotation axis of the reagent container holder are the same.

4. The sample measuring apparatus according to claim 1, wherein
    the reagent container holder has a circular outer circumferential edge such that a plurality of reagent containers are arranged circularly.

5. The sample measuring apparatus according to claim 1, further comprising:
    a joint part through which the rotation table supports the reagent container holder; and
    a supporting unit that supports the rotation table provided with the fin.

6. The sample measuring apparatus according to claim 5, wherein
    the fin comprises a protrusion provided integrally with the rotation table.

7. The sample measuring apparatus according to claim 1, further comprising:
    a transmission shaft that transmits rotation and driving of the driving unit to the reagent container holder.

8. The sample measuring apparatus according to claim 1, wherein
    the reagent container holder comprises a plate-shaped member having a through-hole, and
    the plate-shaped member holds the reagent container such that a bottom surface of the reagent container is exposed from the through-hole.

9. The sample measuring apparatus according to claim 8, wherein
    the plate-shaped member comprises suspending portions, each of which suspends and holds the reagent container.

10. A sample measuring apparatus comprising:
a measuring unit that measures a sample by using a reagent stored in a reagent container;
a reagent storage that includes a case defining an inner space that stores the reagent container;
a reagent container holder arranged in the inner space of the reagent storage and that holds the reagent container;
a rotation table that is arranged in the inner space of the reagent storage;
a fin that is provided in the inner space of the reagent storage and is provided as attached to an underside of the rotation table and that circulates air in the reagent storage; and
a driving unit, wherein
the reagent container holder comprises a first reagent container holder and a second reagent container holder that is arranged around the first reagent container holder, wherein the rotation table supports the second reagent container holder,
the driving unit comprises a first driving unit comprising a first motor that drives the first reagent container holder to rotate and a second driving unit comprising a second motor that drives the rotation table that supports the second reagent container holder and the fin to rotate so as to circulate, by the fin, the air in the reagent storage, and
the rotation table includes multiple openings such that the air passes through the multiple openings between a region below the rotation table and a region above the rotation table.

11. The sample measuring apparatus according to claim 10, further comprising:
a cooling unit comprising a cooling source that cools the air in the reagent storage, wherein
the driving unit drives the rotation table provided with the fin to circulate the air cooled by the cooling unit.

12. The sample measuring apparatus according to claim 10, wherein
the fin, the first reagent container holder, and the second reagent container holder are arranged such that a rotation axis of the rotation table provided with the fin, a rotation axis of the first reagent container holder, and a rotation axis of the second reagent container holder are the same.

13. The sample measuring apparatus according to claim 10, further comprising:
a joint part through which the rotation table supports the second reagent container holder; and
a supporting unit that supports the rotation table.

14. The sample measuring apparatus according to claim 13, wherein
the fin comprises a protrusion provided integrally with the rotation table.

15. The sample measuring apparatus according to claim 11, wherein
the fin, the first reagent container holder, and the second reagent container holder are arranged such that a rotation axis of the rotation table provided with the fin, a rotation axis of the first reagent container holder, and a rotation axis of the second reagent container holder are the same.

16. The sample measuring apparatus according to claim 11, further comprising:
a joint part through which the rotation table supports the second reagent container holder; and
a supporting unit that supports the rotation table.

17. The sample measuring apparatus according to claim 16, wherein
the fin comprises a protrusion provided integrally with the rotation table.

18. The sample measuring apparatus according to claim 12, further comprising:
a joint part through which the rotation table supports the second reagent container holder; and
a supporting unit that supports the rotation table.

* * * * *